United States Patent
He et al.

(10) Patent No.: US 8,934,387 B2
(45) Date of Patent: Jan. 13, 2015

(54) DETECTING A WLAN SIGNAL USING A BLUETOOTH RECEIVER DURING BLUETOOTH SCAN ACTIVITY

(75) Inventors: Jianqiang He, San Diego, CA (US); Kai Bai, Laveen, AZ (US); Gene Fong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 13/101,820

(22) Filed: May 5, 2011

(65) Prior Publication Data

US 2011/0274021 A1    Nov. 10, 2011

Related U.S. Application Data

(60) Provisional application No. 61/332,630, filed on May 7, 2010.

(51) Int. Cl.
H04W 52/02 (2009.01)
H04W 8/00 (2009.01)
H04B 1/38 (2006.01)
H04W 88/06 (2009.01)

(52) U.S. Cl.
CPC .......... *H04W 52/0238* (2013.01); *H04W 8/005* (2013.01); *H04B 1/3805* (2013.01); *H04W 52/028* (2013.01); *Y02B 60/50* (2013.01); *H04W 52/0235* (2013.01); *H04W 88/06* (2013.01)
USPC ....................................... 370/311

(58) Field of Classification Search
USPC ................. 370/311, 235, 310, 318
See application file for complete search history.

(56) References Cited

U.S. PATENT DOCUMENTS

| 6,807,163 B1 | 10/2004 | Shi |
| 2006/0128308 A1 | 6/2006 | Michael et al. |
| 2008/0181155 A1* | 7/2008 | Sherman et al. ............... 370/311 |

(Continued)

FOREIGN PATENT DOCUMENTS

| EP | 1895713 A1 | 3/2008 |
| WO | WO-2009111178 A1 | 9/2009 |
| WO | WO2010045360 A2 | 4/2010 |

OTHER PUBLICATIONS

International Search Report and Written Opinion—PCT/US2011/035635, ISA/EPO—Jul. 22, 2011.

(Continued)

*Primary Examiner* — Andrew Lai
*Assistant Examiner* — Zhiren Qin
(74) *Attorney, Agent, or Firm* — John J. Ketchum

(57) ABSTRACT

A BT receiver RF front end receives RF energy in a sequence of BT scan windows. Throughout a scan window, the front end is tuned to one hop frequency. Before and after the window the front end is in a disabled state. A WLAN energy detector processes an output of the front end during the window and determines whether more than a predetermined amount of RF energy was received onto the front end during the window. A BT baseband processor attempts to demodulate the output of the front end. If the WLAN energy detector determines that the predetermined amount of RF energy was received and if a BT signal could not be demodulated, then a WLAN wake-up signal is asserted, thereby causing a WLAN transceiver to be powered up to receive WLAN signals. BT scan intervals are varied in duration to facilitate a BT scan window overlapping a WLAN beacon.

29 Claims, 13 Drawing Sheets

OPERATION IN ONE BT PAGE SCAN WINDOW

(56) References Cited

U.S. PATENT DOCUMENTS

| | | |
|---|---|---|
| 2009/0221261 A1 | 9/2009 | Soliman |
| 2009/0252128 A1* | 10/2009 | Yang et al. .................... 370/338 |
| 2010/0093279 A1* | 4/2010 | Linsky et al. ................ 455/41.2 |
| 2010/0103834 A1* | 4/2010 | Gorokhov et al. ............ 370/252 |
| 2010/0214232 A1* | 8/2010 | Chan et al. .................... 345/173 |
| 2011/0075720 A1* | 3/2011 | Elenes ......................... 375/232 |

OTHER PUBLICATIONS

Lee S., et al., "Power-Efficient Communication Protocol for Integrated WWAN and WLAN", EURASIP Journal on Wireless Communications and Networking, vol. 2008, 2007, pp. 1-13.

\* cited by examiner

BT MASTER IN THE WIRELESS HEADSET

| $m$ | START OF SCAN PERIOD | END OF SCAN PERIOD - $w_{WLBK}$ | $n$ OF WLAN BEACON THAT INTERSECTS BT SCAN | $x$ RANGE OF OFFSET VALUES WHERE INTERSECTS |
|---|---|---|---|---|
| 0 | 0 | 10 | 0 | [0,10] |
| 1 | 1280 | 1290 | 12 | [80,90] |
| 2 | 2560 | 2570 | 25 | [60,70] |
| 3 | 3840 | 3850 | 38 | [40,50] |
| 4 | 5120 | 5130 | 51 | [20,30] |
| 5 | 6400 | 6410 | 64 | [0,10] |
| 6 | 7680 | 7690 | 76 | [80,90] |
| 7 | 8960 | 8970 | 89 | [60,70] |
| 8 | 10240 | 10250 | 102 | [40,50] |
| 9 | 11520 | 1530 | 115 | [20,30] |
| 10 | 12800 | 12810 | 128 | [0,10] |
| 11 | 14080 | 14090 | 140 | [80,90] |
| 12 | 15360 | 15370 | 153 | [60,70] |
| 13 | 16640 | 16650 | 166 | [40,50] |
| 14 | 19920 | 17930 | 179 | [20,30] |
| 15 | 19200 | 19210 | 192 | [0,10] |
| 16 | 20480 | 20490 | 204 | [80,90] |
| 17 | 21760 | 21770 | 217 | [60,70] |
| 18 | 23040 | 23050 | 230 | [40,50] |

$m$ = BT INTERVAL INDEX $n$ = WLAN INTERVAL INDEX $x$ = TIMING OFFSET $p_{BT}$ = BT PAGE SCAN PERIOD (1280ms)

$p_{WL}$ = WLAN BEACON PERIOD (100ms)

$w_{BT}$ = BT SCAN DURATION (11.25ms, BUT THE USEFUL PORTION IS 10ms.)

$w_{WLBK}$ = WLAN BEACON DURATION (1.25ms)

FIG. 8

| $m$ | START OF SCAN PERIOD | END OF SCAN PERIOD - $w_{WLBK}$ | $n$ OF WLAN BEACON THAT INTERSECTS BT SCAN | $x$ RANGE OF OFFSET VALUES WHERE INTERSECTS |
|---|---|---|---|---|
| 0 | 10 | 20 | 0 | [10,20] |
| 1 | 1280 | 1290 | 12 | [80,90] |
| 2 | 2570 | 2580 | 25 | [70,80] |
| 3 | 3840 | 3850 | 38 | [40,50] |
| 4 | 5130 | 5140 | 51 | [30,40] |
| 5 | 6400 | 6410 | 64 | [0,10] |
| 6 | 7690 | 7700 | 76 | [90,100] |
| 7 | 8960 | 8970 | 89 | [60,70] |
| 8 | 10250 | 10260 | 102 | [50,60] |
| 9 | 11520 | 1530 | 115 | [20,30] |
| 10 | 12810 | 12820 | 128 | [10,20] |
| 11 | 14080 | 14090 | 140 | [80,90] |
| 12 | 15370 | 15380 | 153 | [70,80] |
| 13 | 16640 | 16650 | 166 | [40,50] |
| 14 | 19930 | 17940 | 179 | [30,40] |
| 15 | 19200 | 19210 | 192 | [0,10] |
| 16 | 20490 | 20500 | 204 | [90,100] |
| 17 | 21760 | 21770 | 217 | [60,70] |
| 18 | 23050 | 23060 | 230 | [50,60] |

$m$ = BT INTERVAL INDEX $n$ = WLAN INTERVAL INDEX $x$ = TIMING OFFSET $p_{BT}$ = BT PAGE SCAN PERIOD (1280ms)

$p_{WL}$ = WLAN BEACON PERIOD (100ms)

$w_{BT}$ = BT SCAN DURATION (11.25ms, BUT THE USEFUL PORTION IS 10ms.)

$w_{WLBK}$ = WLAN BEACON DURATION (1.25ms)

FIG. 9

DETERMINE THE END OF THE "DITHERED" BT PAGE SCAN INTERVAL

METHOD OF VARYING THE BT INTERVAL

DETECTING A WLAN SIGNAL USING A BLUETOOTH RECEIVER DURING BLUETOOTH SCAN ACTIVITY

CLAIM OF PRIORITY UNDER 35 U.S.C. §119

This application claims the benefit under 35 U.S.C. §119 of Provisional Application Ser. No. 61/332,630, filed May 7, 2010, entitled "Method and Apparatus To Detect WLAN Signals Using Bluetooth Receiver During Bluetooth Scan Activity", by He et al., said provisional application is incorporated herein by reference.

BACKGROUND INFORMATION

1. Technical Field

The disclosed embodiments relate to waking up a WLAN radio using a BT receiver RF front end.

2. Background Information

Bluetooth (BT) and WLAN (Wireless LAN) are two competing radio technologies that operate using the same 2.4 GHz unlicensed band. WLAN is standardized in IEEE 802.11 and has several variants including IEEE 802.11(n). Bluetooth is a commercial implementation of a Wireless Personal Area Network (WPAN) technology standardized in IEEE 802.15.1.

WLAN and BT, however, differ in that BT is a relatively simple system intended for short ranges in applications that do not require high reliability. WLAN, on the other hand, is more complex and generally more expensive to implement and is intended for larger distances. WLAN involves relatively complex modulation and the energy of the WLAN signal is spread over a wider frequency range of about 22 MHz. The more complex modulation and higher code rate used by WLAN help ensure that WLAN transmissions can be received. A wideband receiver RF front end is therefore required to receive the 22 MHz wide WLAN signals. More complex, and therefore power consuming, demodulation circuitry is also required for WLAN radios. BT, on the other hand, involves relatively simple modulation. The energy of the BT signal is generally confined to a narrower 1 MHz frequency range so a relatively narrow band receiver RF front end can be used. For numerous reasons, WLAN radios generally consume more power than BT radios.

Two types of devices may engage in WLAN communication, an Access Point (AP) and a station (STA). In one common operational scenario, the STA is not attempting to transmit to a WLAN AP, but the STA is out of radio range of the WLAN AP and is in a low power mode referred to as Out-of-Service (OoS). A WLAN AP periodically transmits beacon packets. If an OoS STA were to come into radio range of a WLAN AP, then beacon packets from the WLAN AP would periodically be receivable at the OoS STA. In such a situation, the STA should detect the beacons and begin communicating with the WLAN AP to join the WLAN network. To accomplish this, an OoS STA periodically scans to detect beacons by waking its receiver scan the WLAN channels. There are thirteen such channels. Although the WLAN receiver is inactive for about ninety percent of the time, the WLAN receiver of the STA is active for about ten percent of the time even though the OoS STA is only scanning and is not actually in use. This amounts to a large amount of power consumption. In mobile devices it may be desirable to reduce this power consumption of an OoS STA.

Some types of mobile devices include a BT transceiver in addition to the WLAN transceiver. If a BT transceiver and a WLAN transceiver exist in the same device, the BT and WLAN transceivers are said to coexist. To avoid wasting power, proposals have been made to use the BT receiver to search for WLAN signals. Rather than using the more power hungry WLAN receiver for this purpose, the BT receiver is used. If energy in the 2.4 GHz unlicensed band is detected using the BT receiver, then the WLAN radio is activated to perform subsequent normal WLAN communications. Published U.S. Patent Application US200801081155, for example, describes using a BT receiver to detect WLAN energy. The BT receiver is tuned to several frequencies that are spaced over the WLAN channel frequency band. An energy sample is taken at each frequency and the samples are analyzed to detect WLAN energy. In another example, the BT receiver is tuned to the center frequency of the WLAN channel frequency band. After accumulating the received energy for a length of time, the energy of the sample is compared to a threshold and if the threshold is exceeded then the WLAN radio is activated. Alternative and better ways of using BT receivers to detect WLAN energy are sought.

SUMMARY

A device includes a BT transceiver, a WLAN transceiver, and a WLAN energy detector circuit. In one exemplary method, the WLAN transceiver is initially in a low power state such that the WLAN transceiver cannot receive and demodulate a WLAN beacon signal. When the WLAN transceiver is in this low power state, a BT receiver RF front end of the BT transceiver is used in a page scan mode to receive RF energy in a sequence of BT scan windows. RF energy, that happens to be WLAN energy, is received onto the BT receiver RF front end during one of these BT scan windows. The WLAN energy detector circuit processes an output signal of the BT receiver RF front end when the BT receiver RF front end is receiving the WLAN energy during this one of the BT scan windows. The BT receiver RF front end is tuned to receive at a single fixed BT hop frequency throughout this BT scan window. The BT hop frequency is determined in accordance with a Bluetooth standard.

Based at least in part on a result of this processing done by the WLAN energy detector on the output of the BT receiver RF front end during this one BT scan window, a first signal is generated. This first signal (for example, an energy detect signal) is indicative of the BT receiver RF front end having received the WLAN energy during the BT scan window. In addition to the BT receiver RF front end, the BT transceiver includes a BT baseband processor. The BT baseband processor processes an output signal of the BT receiver RF front end and as a result outputs a second signal. The second signal (for example, a BT demod signal) is indicative of the whether the BT baseband processor has successfully demodulated a BT signal.

A WLAN wake-up signal is asserted when both of the following occur: 1) the first signal indicates that the BT receiver RF front end received more than a predetermined amount of RF energy during the BT scan window, and 2) the second signal indicates that the BT baseband processor did not successfully demodulate a BT signal. In one example, immediately prior to the one BT scan window, the BT receiver RF front end is unpowered or otherwise disabled and cannot and does not receive RF signals. Similarly, immediately after the one BT scan window, the BT receiver RF front end is unpowered or otherwise disabled and cannot and does not receive RF signals. Throughout the one BT scan window the BT receiver RF front end is tuned to receive at a single BT hop frequency.

The WLAN wake-up signal so generated is then supplied to the WLAN transceiver. In response to the asserting of the WLAN wake-up signal, at least a portion of the WLAN transceiver is powered up or otherwise enabled such that before powering up the WLAN transceiver was unable to receive a WLAN signal but after being powered up the WLAN transceiver is capable of receiving a WLAN signal. As a result of the asserting of the WLAN wake-up signal, the WLAN transceiver transitions from a lower power state to a higher power state. In one advantageous aspect, once the WLAN transceiver is powered up and operational due to the asserting of the WLAN wake-up signal, the WLAN energy detector circuit is unpowered or disabled to reduce power consumption. The WLAN energy detector circuit is unpowered throughout the time the WLAN transceiver is operational.

In some examples, operation of the WLAN energy detector circuit is said to "piggy-back" on the BT transceiver in that tuning and operation of the BT receiver RF front end is conventional other than the aspect of when the BT scan windows start and stop. Each BT scan interval of a sequence of BT scan intervals has a BT scan window. The BT receiver RF front end and the WLAN energy detector are used together in each of these WLAN scan windows in an attempt to detect RF energy as set forth above and if appropriate to assert the WLAN wake-up signal, thereby waking up the WLAN transceiver. At the other times outside these BT scan windows, the BT receiver RF front end is disabled and is not usable to receive RF energy.

To facilitate at least one BT scan window (of the many BT scan windows of a sequence of BT scan intervals) overlapping a WLAN beacon in time so that the energy of the WLAN beacon can be detected, the BT scan intervals are varied in duration. In one specific example, the durations of BT scan intervals are dithered such that consecutive BT scan intervals, one to the next, alternate back and forth between a smaller BT scan interval value and a larger BT scan interval value. Both the BT master and the BT slave of the Bluetooth link employ this modified scan interval timing. Although BT scan interval dithering between two interval values is described here as an example, this example is but one of many possible ways that the durations of BT scan intervals can be varied in accordance with a general novel BT scan interval duration varying method set forth here.

There are various ways of implementing the WLAN energy detector circuit. In one specific example, the WLAN energy detector circuit includes a Low-Pass Filter (LPF) portion, an adjustable gain amplifier portion, an Analog-to-Digital Converter (ADC) portion, and a Digital Signal Processing (DSP) portion. An output signal of the BT receiver RF front end is filtered by the LPF portion. The output of the LPF portion is amplified by the adjustable gain amplifier portion, and the amplified resulting signal is digitized by the ADC portion. In one example, the output signal from the BT receiver RF front end includes an In-phase (I) signal component and a Quadrature-phase (Q) signal component. For each of the I signal path and the Q signal path there is a separate LPF, a separate adjustable amplifier, and a separate ADC. The resulting I stream of digitized values and the resulting Q stream of digitized values are then analyzed by the DSP portion to make a determination whether an amount of RF energy received by the BT receiver RF front end exceeds a predetermined threshold. If the determination is that the threshold is exceeded, and if the output of the BT receiver RF front end could not be successfully demodulated by the BT baseband processor, then the DSP asserts the WLAN wake-up signal.

In one advantageous aspect, the signal bandwidth of the low-pass filters is substantially greater than the 1 MHz bandwidth of a BT signal and is substantially smaller than the approximate 20 MHz bandwidth of a WLAN signal. In a second advantageous aspect, ADCs used to digitize the I and Q signal streams in the WLAN energy detector circuit are of substantially lower resolution and lower power consumption than the ADCs in the main I and Q signal paths extending into the BT baseband processor. In a third advantageous aspect, LPF/amplifier/ADC circuitry for only one signal path (either for the I signal path or for the Q signal path) through the WLAN energy detector circuit is provided and the energy detection determination in the DSP is made based on the digitized output of only one ADC. Although examples of the WLAN energy detector circuit implemented in digital form are described above, these are just examples. In other specific examples, the WLAN energy detector circuit is implemented in analog circuitry without a DSP. Various novel aspects described above can be practiced independently of one another. For example, the varying of the durations of the BT scan intervals can be practiced without use of any special or additional WLAN energy detector circuit. The BT baseband processor may, for example, detect RF energy that it determines is likely not BT energy such that the BT baseband processor itself generates the WLAN wake-up signal without an additional WLAN energy detector circuit.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein

BRIEF DESCRIPTION OF THE DRAWINGS

FIG. 8 is a table that illustrates how a BT scan window may never overlap a WLAN beacon transmission if conventional scheduling of BT scan intervals is employed.

FIG. 9 is a table that illustrates how a BT scan window is guaranteed to overlap a WLAN beacon transmission in one particular example if the durations of the BT scan intervals are varied in accordance with one novel aspect.

DETAILED DESCRIPTION

Systems and methods are described below whereby a WLAN transceiver is in a low power state during a time when a co-located BT transceiver is scanning for a BT signal in a BT scan window at a single BT hop frequency. A WLAN energy detector circuit processes a signal output by a BT receiver RF front end of the BT transceiver during the BT scan window time. If the WLAN energy detector circuit detects an amount of RF energy and if the BT transceiver does not successfully demodulate a BT signal, then the WLAN transceiver is powered up into a higher power state so that it can thereafter receive WLAN signals. The operation of the WLAN energy detector circuit is said to "piggy-back" on the BT scanning because the WLAN energy detection (RF energy detection in a WLAN frequency band) occurs on a signal output by the BT receiver RF front end when the BT receiver RF front end is in a BT scan window at one BT hop frequency such that front end can simultaneously be used for BT scanning. Normal tuning of the BT receiver RF front end is not affected, but the durations of the BT scan intervals are varied in some embodiments to facilitate BT scan windows overlapping a WLAN beacon in time so that the WLAN beacon can be detected.

An Exemplary System

Figure 1:
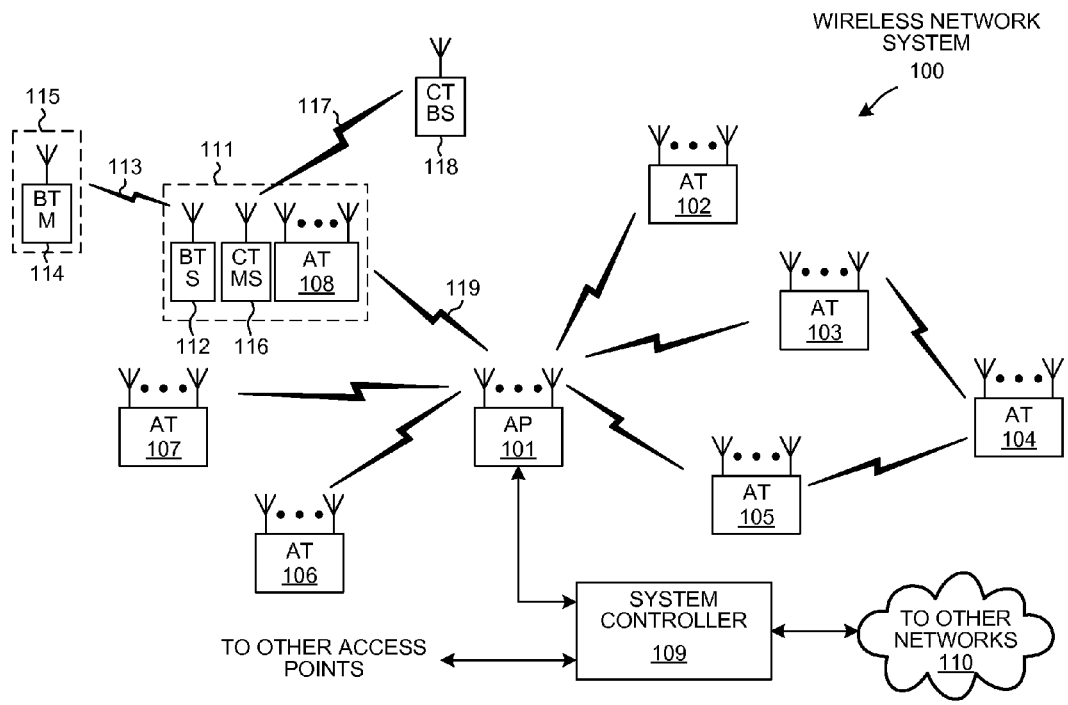
FIG. 1 is a high-level diagram of a wireless network system that carries out a method of detecting WLAN energy and waking up a WLAN transceiver.

FIGS. 1-6 set forth an exemplary system that carries out a method of detecting WLAN energy and waking up a WLAN transceiver. FIG. 1 is a high-level diagram of a wireless network system 100, which is also referred to herein as a Basic Service Set (BSS). Wireless network system 100 includes several wireless nodes generally designated as Access Points (APs) and a plurality of Access Terminals (AT) or stations (STA) 102-108. Although only one AP 101 is illustrated, wireless network system 100 can include many such APs distributed throughout a geographic region to provide broader coverage. Each wireless node is capable of receiving and/or transmitting. In the description that follows, the term "access point" is used to designate a receiving node and the term "access terminal" is used to designate a transmitting node for uplink communications. However, those skilled in the art will readily understand that other terminology or nomenclature may be used for an AP and/or AT. By way of example, an AP may be referred to as a base station, a base transceiver station, a station, a terminal, a node, a wireless node, an access terminal acting as an access point, or some other suitable terminology. An AT may be referred to as a user terminal, a node, a wireless node or some other suitable terminology. The various concepts described throughout this disclosure are intended to apply to all suitable wireless nodes regardless of their specific nomenclature.

If wireless network system 100 includes multiple APs distributed throughout a geographic region, then a system controller 109 may be used to provide coordination and control of these various APs, as well as to provide access to other networks. The Internet cloud symbol 110 is representative of these other networks. An AP is generally a fixed terminal that provides backhaul services to access terminals in the geographic region of coverage. However, the AP may be mobile in some applications. An AT, which may be fixed or mobile, utilizes the backhaul services of an AP or engages in peer-to-peer communications with other ATs. An AT may be embodied as part of another device such as a telephone (e.g., cellular telephone), a laptop computer, a desktop computer, a Personal Digital Assistant (PDA), a digital audio player (e.g., MP3 player), a camera, a game console, or another suitable wireless node.

In the particular example of wireless network system 100 of FIG. 1, one of the ATs 108 is a part of a cellular telephone 111. The AT 108 engages in WLAN wireless communications 119 with AP 101. Cellular telephone 111, in addition to the WLAN AT 108, includes a Bluetooth transceiver functionality 112. Bluetooth transceiver functionality 112 in this case is a Bluetooth Slave (BT S) that engages in bidirectional Bluetooth communications 113 in a wireless fashion with a Bluetooth Master 114 (BT M) in accordance with an IEEE 802.15.1 standard. In the particular example of the system 100 of FIG. 1, the Bluetooth master 114 is a part of a wireless headset 115. In addition to the WLAN functionality afforded by WLAN AT 108, and in addition to the BT functionality afforded by BT S 112, the cellular telephone 111 includes a Cellular Telephone network Mobile Station (CT MS) functionality 116. CT MS 116 can engage in bidirectional wireless cellular telephone communications 117 with a Cellular Telephone network Base Station (CT BS) 118.

Figure 2:
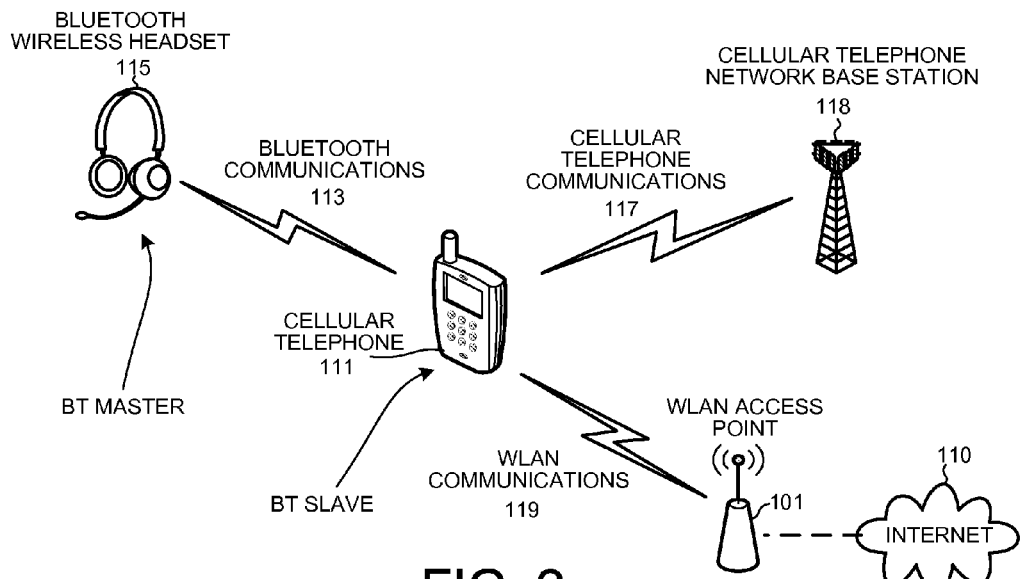
FIG. 2 is a more detailed diagram of a part of the wireless network system of FIG. 1.

FIG. 2 is a more detailed diagram of a part of wireless network system 100 of FIG. 1. Cellular telephone 111 can engage in bidirectional wireless Bluetooth communications 113 with wireless headset 115 and also can engage in bidirectional wireless WLAN communications 119 with WLAN AP 101. Cellular telephone 111 can engage in bidirectional cellular telephone communications 117 with CT BS 118.

Figure 3:
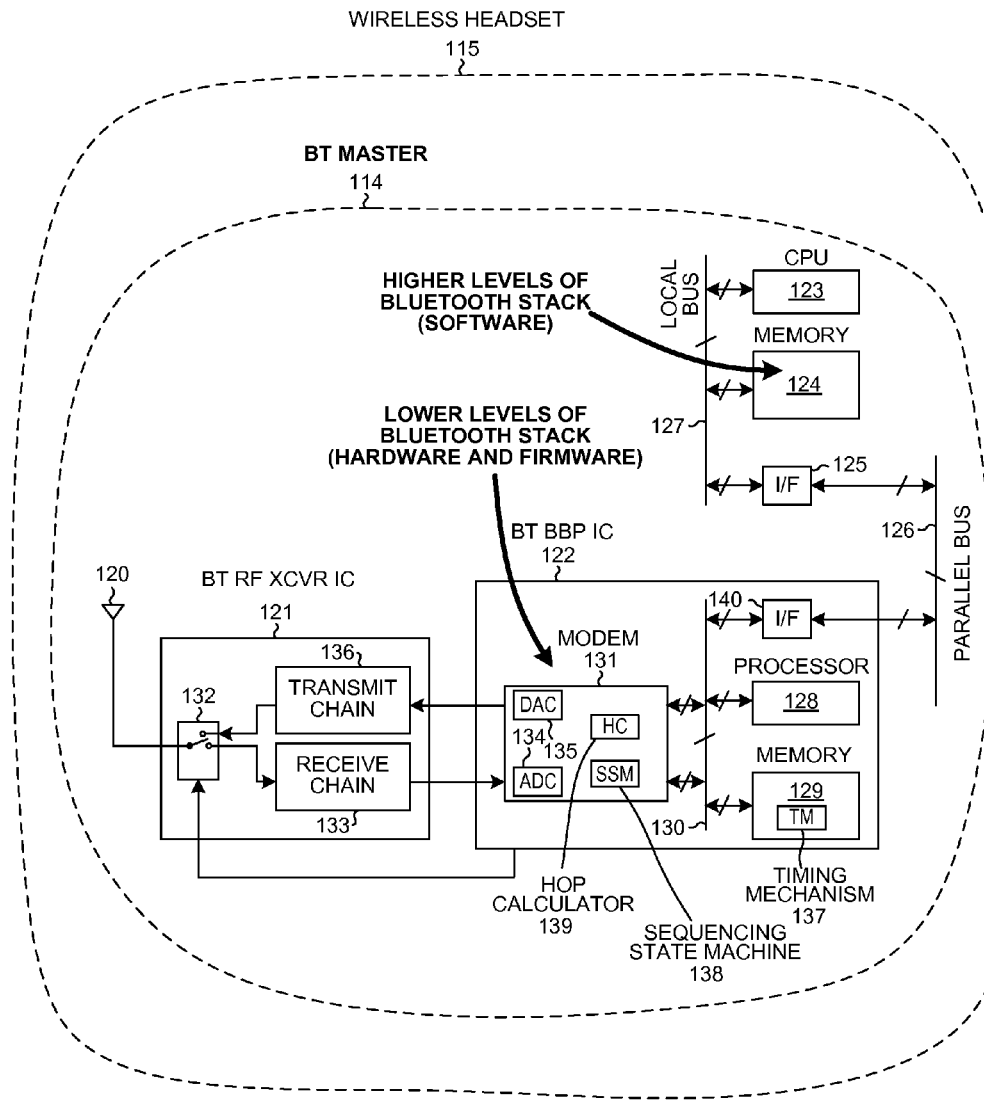
FIG. 3 is a more detailed diagram of the BT M circuitry 114 within the wireless headset 115 of FIG. 1.

FIG. 3 is a more detailed diagram of the BT M circuitry 114 within the wireless headset 115 of FIG. 1. BT M 114 includes (among other parts not illustrated) an antenna 120, a Bluetooth Radio Frequency transceiver Integrated Circuit (BT RF XCVR IC) 121, a Bluetooth Baseband Processor Integrated Circuit (BT BBP IC) 122, a Central Processing Unit (CPU) 123, an amount of memory 124, a bus interface 125, and a parallel bus 126. CPU 123 executes programs of instructions stored in memory 124. CPU 123 accesses memory 124 via a local bus mechanism 127. BT BBP IC 122 includes a processor 128. Processor 128 executes programs of instructions stored in memory 129. The processor 128 accesses memory 129 via an on-chip local bus mechanism 130. CPU 123 can read and write across the parallel bus 126 via bus interface 125. Similarly, processor 128 can read and write across the parallel bus 126 via bus interface 140. BT BBP IC 122 also includes a Bluetooth modem portion 131 for modulating and demodulating Bluetooth signals.

Although the specific BT M circuitry described here involves two integrated circuits 121 and 122, it is to be understood that the circuitry on those integrated circuits can be integrated in other ways such as on a single integrated circuit, or can be implemented in discrete form. Although in the specific BT M described the bus 126 is a parallel bus, in other implementations the multiple buses or serial buses or other communication mechanisms can be used to perform the function of bus 126. The specific circuitry of FIG. 3 is provided just as an example.

If a transmitted Bluetooth signal is received onto antenna 120, the signal passes through switch 132 and is amplified, down-converted, and baseband filtered in the receive chain 133 of the BT RF XCVR IC 121. The resulting down-converted analog signal is digitized by an Analog-to-Digital Converter (ADC) 134 in modem portion 131. The digitized signal is then demodulated in BT modem portion 131. The recovered information is then available across local bus mechanism 130 for use by processor 128. If information is to be transmitted, then the information passes across the local bus mechanism 130 to a modulation portion of the BT modem portion 131. The resulting modulated signal is converted into analog form by Digital-to-Analog Converter (DAC) 135. The resulting analog signal is then baseband filtered, upconverted and amplified in the transmit chain 136 of the BT RF XCVR IC 121. The amplified signal passes through switch 132 and to antenna 120 for transmission as a Bluetooth signal.

Bluetooth communication involves frequency hopping in a pseudo-random fashion between seventy-nine different 1 MHz wide channels. In the time domain, information is communicated in 625 microsecond periods of time referred to as BT slots. The BT M typically transmits in even numbered slots whereas the BT S typically transmits in odd numbered slots. A new connection between a BT master and a BT slave is established using an inquiry procedure and a page scan procedure. In the paging procedure, the BT master transmits two messages every other 625 microsecond BT slot, with the master changing the hop channel for each new message transmitted. The BT slave is not yet synchronized to the BT master. The BT slave therefore does not know when the BT master will transmit such a message. The BT slave powers up and tunes its BT receiver as necessary to receive at a single hop frequency for the duration of at least one 11.25 millisecond BT scan window. If the BT slave receives a message, then the BT slave transmits a response message back to the BT master. If the BT master receives the response message, then the BT master transmits back a message that enables the BT slave to synchronize to the channel frequency hopping sequence and to the timing used by the BT master. The BT master and BT slave are then synchronized, with the BT master transmitting in certain slots and with the BT slave transmitting in other slots.

In the circuit of FIG. 3, timing mechanism 137 is an amount of firmware usable to determine when BT slots start and stop so that the remainder of the BT radio circuitry of the BT master can be properly powered up and configured to receive or to transmit at the appropriate times. Processor 128 executes the firmware and as a result of this execution generates a trigger signal. This trigger signal triggers a sequencing state machine 138. Once properly triggered for a power up sequence, the sequencing state machine 138 powers up the various circuits required for receiving in a predetermined order so that the BT receiver as a whole is functional when it is needed. Similarly, the timing mechanism 137 initiates powering down the BT receiver at the appropriate times. To initiate a power down of the BT receiver, the timing mechanism triggers the sequencing state machine 138. Once properly triggered for a power down sequence, the sequencing state machine 138 controls the various circuits of the receiver circuitry to power down in a predetermined order. In this way, the timing mechanism 137 causes the remainder of the BT radio to be powered up and powered down at the appropriate times depending on the operating mode of the BT M.

Although in the specific embodiment illustrated the timing mechanism is firmware, it is to be understood that the functionality of the timing mechanism firmware can be realized in software, in firmware, in hardware, or in combinations of these. In another embodiment, for example, the timing mechanism functionality is realized as a hardwired state machine that does not execute firmware instructions. The state machine is coupled to bus 130 and is considered to be a part of BT modem 122. Other ways of implementing the timing mechanism are possible.

BT modem portion 131 also includes a hop calculator 139. The hop calculator is an amount of dedicated hardware that is accessible to firmware across bus 130 as a resource. It is usable by both transmit and receive firmware processes to determine the next hop frequency that should be employed in accordance with the pseudo-random frequency hopping sequence.

BT master 114 implements a Bluetooth protocol processing stack as is known in the art. Higher protocol processing layers of the BT stack are realized in software form as code stored in memory 124. Lower protocol processing layers of the BT stack are realized in hardware in the BT RF XCVR IC 121 and in BT modem portion 131, and in firmware stored in memory 129.

Figure 4:
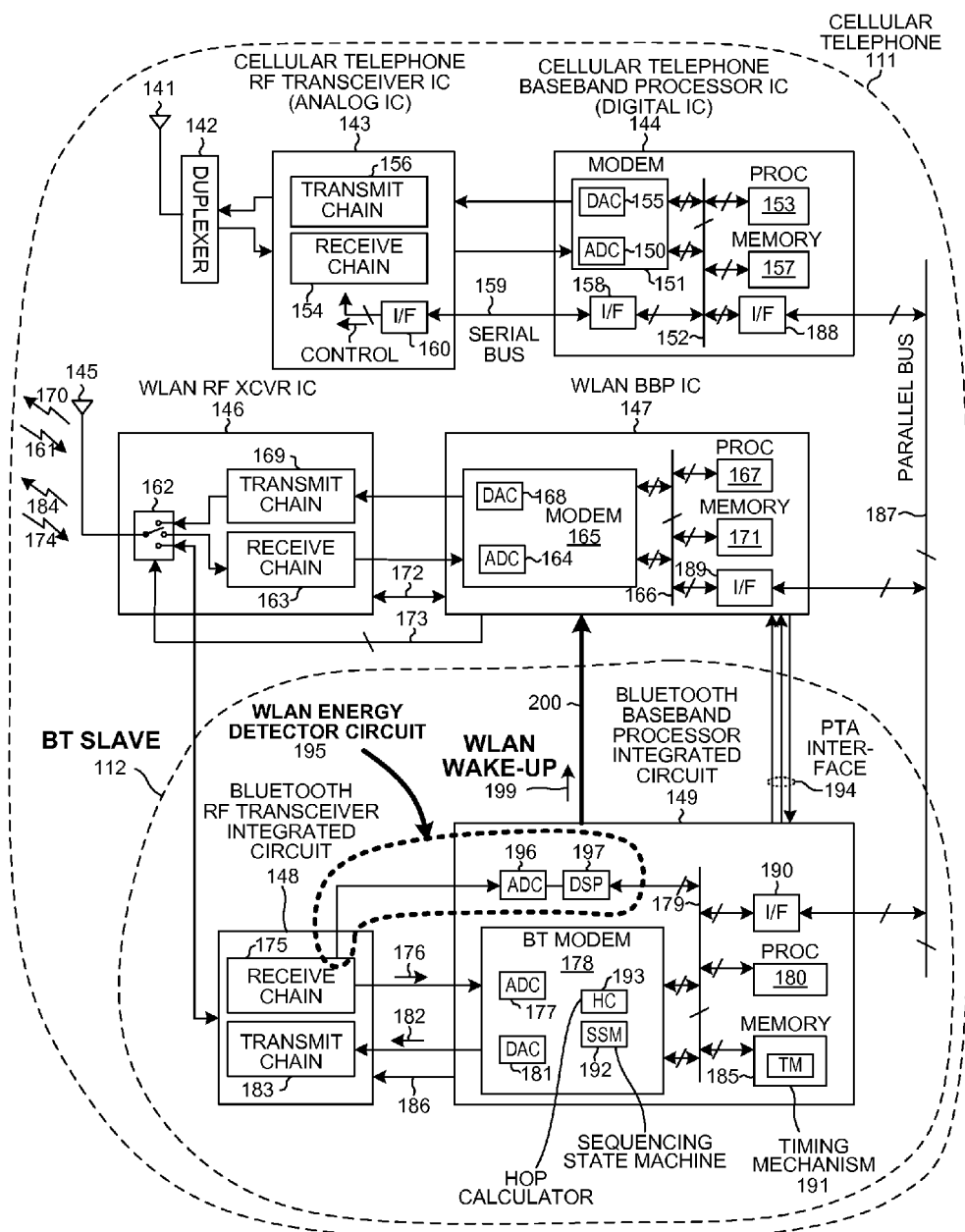
FIG. 4 is a more detailed diagram of the BT S circuitry 112 within the cellular telephone 111 of FIG. 1.

FIG. 4 is a more detailed diagram of the cellular telephone 111 of FIG. 1. The functionality of the cellular telephone mobile station 116 may be realized in the circuit of FIG. 4 as antenna 141, duplexer 142, a cellular telephone RF transceiver integrated circuit 143, and cellular telephone baseband processor integrated circuit 144. The functionality of the WLAN AT 108 of FIG. 1 may be realized in the circuit of FIG. 4 as antenna 145, WLAN RF transceiver integrated circuit 146, and WLAN baseband processor IC 147. The functionality of the BT S 112 of FIG. 1 may be realized in the circuit of FIG. 4 as antenna 145, Bluetooth RF transceiver integrated circuit 148, and Bluetooth baseband processor integrated circuit 149.

If a cellular telephone signal is received onto antenna 141, the signal passes through duplexer 142 and is amplified, down-converted, and baseband filtered in the receive chain 154 of cellular telephone RF transceiver integrated circuit 143. The resulting down-converted analog signal is digitized by an ADC 150 in modem 151. The digitized signal is then demodulated by a demodulation portion of modem 151. The demodulated information is then available across local bus mechanism 152 for use by processor 153. If information is to be transmitted, then the information passes across local bus mechanism 152 to a modulation portion of BT modem 151. The resulting modulated signal is converted into analog form by Digital-to-Analog Converter (DAC) 155. The resulting analog signal is then baseband filtered, upconverted and amplified in the transmit chain 156. The amplified signal passes through switch 142 and to antenna 141 for transmission. Processor 153 executes programs of instructions stored in memory 157. Processor 153 controls the upconverting for transmission and the down-converting for receiving by sending control information to the RF transceiver integrated circuit 143 via bus mechanism 152, bus interface 158, serial bus 159, and bus interface 160.

If a WLAN signal 161 is received onto antenna 145, the signal passes through antenna switch 162 and is amplified, down-converted, and baseband filtered in the receive chain 163 of WLAN RF transceiver integrated circuit 146. After the WLAN signal is received by WLAN RF XCVR IC 146, the resulting down-converted analog signal is digitized by an ADC 164 in modem 165. The digitized WLAN signal is then demodulated by a demodulation portion of modem 165. The demodulated information is then available across local bus mechanism 166 for use by processor 167. If information is to be transmitted, then the information passes across local bus mechanism 166 to a modulation portion of modem 165. The resulting modulated signal is converted into analog form by Digital-to-Analog Converter (DAC) 168. The resulting analog signal is then baseband filtered, upconverted and amplified in the transmit chain 169. The amplified signal passes through switch 162 and to antenna 161 for transmission as WLAN signal 170. Processor 167 executes programs of instructions stored in memory 171. WLAN BBP IC 147 controls the WLAN RF XCVR IC 146 and tunes the receiver and transmitter as appropriate by send control information to the WLAN RF XCVR IC 146 via bus 172 and conductor 173.

If a Bluetooth signal 174 is received onto antenna 145, the signal passes through antenna switch 162 and is amplified, down-converted, and baseband filtered in the receive chain 175 of BT RF transceiver integrated circuit 148. The resulting down-converted analog signal 176 is digitized by an ADC 177 in BT modem 178. The digitized signal is then demodulated by a demodulation portion of modem 178. The demodulated information is then available across bus mechanism 179 for use by processor 180. If information is to be transmitted, then the information passes across local bus mechanism 179 to a modulation portion of BT modem 178. The resulting modulated signal is converted into analog form by Digital-to-Analog Converter (DAC) 181. The resulting analog signal 182 is then baseband filtered, upconverted and amplified in the transmit chain 183. The amplified signal passes through switch 162 and to antenna 145 for transmission as BT signal 184. Processor 180 executes programs of instructions stored in memory 185. BT baseband processor integrated circuit 149 controls and tunes the BT RF transceiver integrated circuit 148, including the BT receiver RF front end portion of integrated circuit 148, by sending control information to BT RF transceiver integrated circuit 148 across serial bus 186.

Processor 153 of cellular telephone baseband processor integrated circuit 144 can read and write across parallel bus 187 via parallel bus interface 188. Processor 167 of the WLAN baseband processor integrated circuit 147 can read and write across parallel bus 187 via parallel bus interface 189. Processor 180 of the BT baseband processor integrated circuit 149 can read and write across parallel bus 187 via parallel bus interface 190. A PTA (Packet Traffic Arbiter) coexistence mechanism 194 couples the WLAN and BT functionalities together to facilitate scheduling of WLAN transmissions in quiet periods between BT transmissions.

Timing mechanism 191 is an amount of firmware usable to determine when BT scan intervals and slots start and stop so that the remainder of the BT radio circuitry of the BT slave 112 can be properly powered up and configured to receive or to transmit at the appropriate times. Processor 180 executes the firmware and as a result a trigger signal is generated. The trigger signal may, for example, be a communication made across local bus 179. This trigger signal triggers a sequencing state machine 192. Once properly triggered for a power up sequence, the sequencing state machine 192 powers up the various circuits required for receiving in a predetermined order so that the BT receiver as a whole is functional when it is needed. Similarly, the timing mechanism 191 initiates powering down the BT receiver at the appropriate times. To initiate a power down of the BT receiver, the timing mechanism triggers the sequencing state machine 192. Once properly triggered for a power down sequence, the sequencing state machine 192 controls the various circuits of the receiver circuitry to power down in a predetermined order. The timing mechanism 191 causes the remainder of the BT receiver to be powered up and to be powered down at the appropriate times depending on the operating mode of the BT slave. The modem 178 also includes a hop calculator 193. Hop calculator 193 is an amount of dedicated hardware that is accessible to firmware as a resource. It is usable by both transmit and receive firmware processes across bus 179 to determine the next hop frequency that should be employed in accordance with the pseudo-random frequency hopping sequence.

Cellular telephone 111 includes a Bluetooth protocol processing stack. The higher layers of the Bluetooth stack are realized in software executed by processor 153 out of memory 157. The lower layers of the Bluetooth stack are realized in hardware in the Bluetooth RF transceiver integrated circuit 148 and in the BT modem 178 of the Bluetooth baseband processor integrated circuit 149 and in firmware executed by processor 180 and stored in memory 185.

BT slave 112 also includes a WLAN energy detector circuit 195. WLAN energy detector circuit 195 includes, among other portions not illustrated in FIG. 4, an ADC portion 196 and a Digital Signal Processor (DSP) portion 197. WLAN energy detector circuit 195 processes an output signal 198 (see FIG. 5) of the BT receiver RF front end of the BT RF transceiver integrated circuit 148. As a result of this processing, WLAN energy detector circuit 195 outputs a WLAN wakeup signal 199. WLAN wakeup signal 199 is indicative of the WLAN energy detector circuit 195 having detected an amount of WLAN energy as further described. WLAN wakeup signal 199 is communicated across conductor 200 from BT baseband processor integrated circuit 149 to WLAN baseband processor integrated circuit 147.

Figure 5:
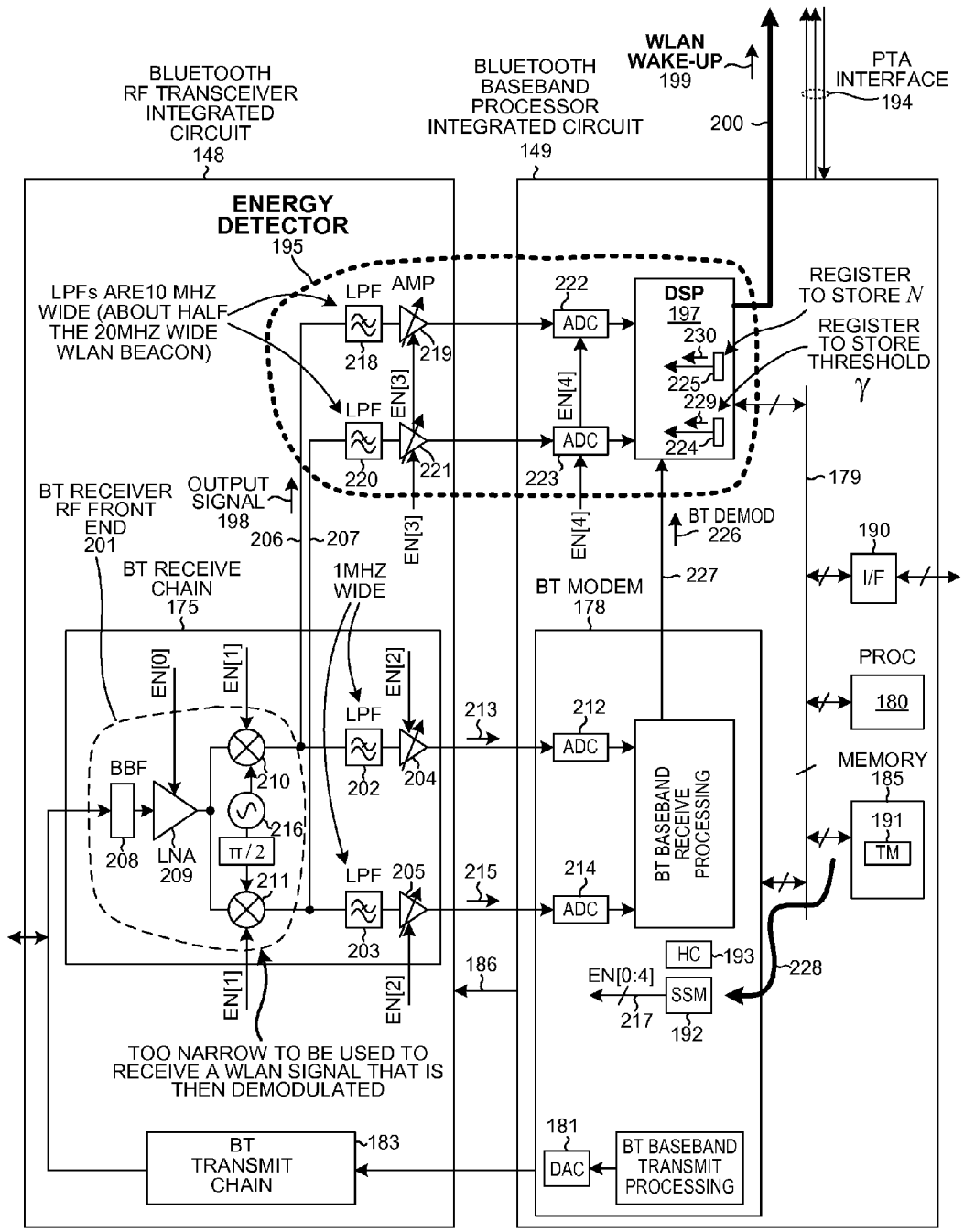
FIG. 5 is a more detailed diagram of the Bluetooth slave integrated circuits 148 and 149 of FIG. 4.

FIG. 5 is a more detailed diagram of the Bluetooth slave integrated circuits 148 and 149 of FIG. 4. BT receive chain 175 includes a BT receiver RF front end 201, a pair of Low Pass Filters (LPF) 202 and 203, and a pair of adjustable gain amplifiers 204 and 205. Output signal 198 of the BT receiver RF front end 201 actually includes an In-phase (I) signal on conductor 206 and Quadrature-phase (Q) signal on conductor 207. BT receiver RF front end 201 includes a baseband filter 208, Low Noise Amplifier (LNA) 209, and a pair of mixers 210 and 211 interconnected in a quadrature configuration as shown. The control information received onto BT RF transceiver integrated circuit 148 via serial bus 186 adjusts the local oscillator 216 of the BT receiver RF front end by indirectly via other interface circuitry not shown here. BT receiver RF front end 201 has a bandwidth that is appropriate for receiving BT signals and may be too narrowband to be used to receive a WLAN signal such that the WLAN signal can then be successfully demodulated. The receive bandwidth generally is substantially less than 20 MHz and in the present example is about 1 MHz. The BT receiver FR front end 201, however, is usable to detect WLAN energy as described in further detail below.

In BT modem portion 178, the ADC 177 that is shown in simplified fashion in FIG. 4 actually includes a first ADC 212 that digitizes a down-converted I signal 213 and a second ADC 214 that digitizes a down-converted Q signal 215. Signal 176 in FIG. 4 actually comprises I signal 213 and Q signal 215. Sequencing state machine 192 outputs enable signals EN[0:4] that that are supplied via conductors 217 to the various parts of the BT receiver RF front end 201 and the energy detector 195 as illustrated. It is through EN[0:4] that the sequencing state machine 192 powers up and powers down the BT receiver RF front end 201 and the energy detector circuit 195. Rather that powering up and down the front end 201 and energy detector by connecting and disconnecting these circuits from supply power, the circuits can be enabled and disabled. When disabled from switching, circuits consume considerably less power than when they are switching. Consequently in one embodiment, the powering up involves enabling circuits to transition from a lower power state in which they are not switching to a higher power state in which they are switching. Arrow 228 indicates the communication of triggering control information by which timing mechanism 191 (execution of the firmware by processor 180) triggers sequencing state machine 192 to output enable signals EN[0:4] in a proper power up sequence or in a proper power down sequence.

Energy detector circuit 195 includes a portion in BT RF transceiver integrated circuit 148 and a portion in BT baseband processor integrated circuit 149. The portion in the BT RF transceiver integrated circuit 148 includes a first analog Low Pass Filter (LPFs) 218 and a first adjustable gain amplifier 219 for processing the I signal portion of output signal 198 and a second analog Low Pass Filter (LPFs) 220 and a second adjustable gain amplifier 221 for processing the Q signal portion of output signal 198. LPFs 218 and 219 are not in the BT receive signal path and are not in the WLAN receive signal path. LPFs 218 and 220 have a passband bandwidth that is wider than the passband bandwidth of LPFs 202 and 203. In the present example, LPFs 218 and 220 have a 10 MHz passband bandwidth of about half of the 20 MHz wide bandwidth of a WLAN beacon signal. Although they could be wider so that all down-converted signals would be in band, making LPFs 218 and 220 this wide would result in a lower Signal-to-Noise Ratio (SNR). The lower SNR would result in degraded detection sensitivity. Making the LPFs 10 MHz wide improves SNR and improves detection sensitivity, but it also increases detection delay because some valid WLAN signals will fall out of band. Accordingly, there is a "detection sensitivity" to "detection delay" tradeoff. The WLAN energy detector circuit 195 may employ 10 MHz wide LPFs 218 and 220 to improve SNR and to improve detection sensitivity at the expense of increasing detection delay a small amount.

In some examples, the bandwidth of LPFs 218 and 220 are digitally adjustable under software or firmware control by processor 180 so that the tradeoff between sensitivity and detection delay can be adjusted. Processor 180 sends control information across serial bus 186 that in turn is supplied to LPFs 218 and 220.

Adjustable gain amplifiers 219 and 221 can be enabled and disabled by the EN[3] signal. In the portion of the energy detector circuit 195 in the BT baseband processor integrated circuit, two ADCs 222 and 223 are shown. These two ADCs 222 and 223 together comprise what is shown in simplified form in FIG. 4 as ADC symbol 196. These ADCs 222 and 223 are of substantially lower resolution and are of lower power than are the ADCs 212 and 214. They provide just enough resolution to make the WLAN energy detection determination. ADCs 222 and 223 can be disabled and put into an unpowered and disabled state by the EN[4] signal. In the present example, ADCs 222 and 223 may output four million three-bit values per second, whereas ADCs 212 and 214 may output four million four-bit values per second. DSP 197 includes two registers 224 and 225. Processor 180 can write these registers 224 and 225 via local bus mechanism 179. Register 224 stores a window value N 229. Register 225 stores a threshold value γ 230. The significance of these values 229 and 230 is explained in further detail below. If the BT modem portion 178 successfully demodulates a BT signal, this occurrence is communicated to energy detector circuit 195 by asserting the BT DEMOD signal 226 on conductor 227. Asserting of signal 226 indicates that a BT signal has successfully been received and demodulated.

Figure 6:
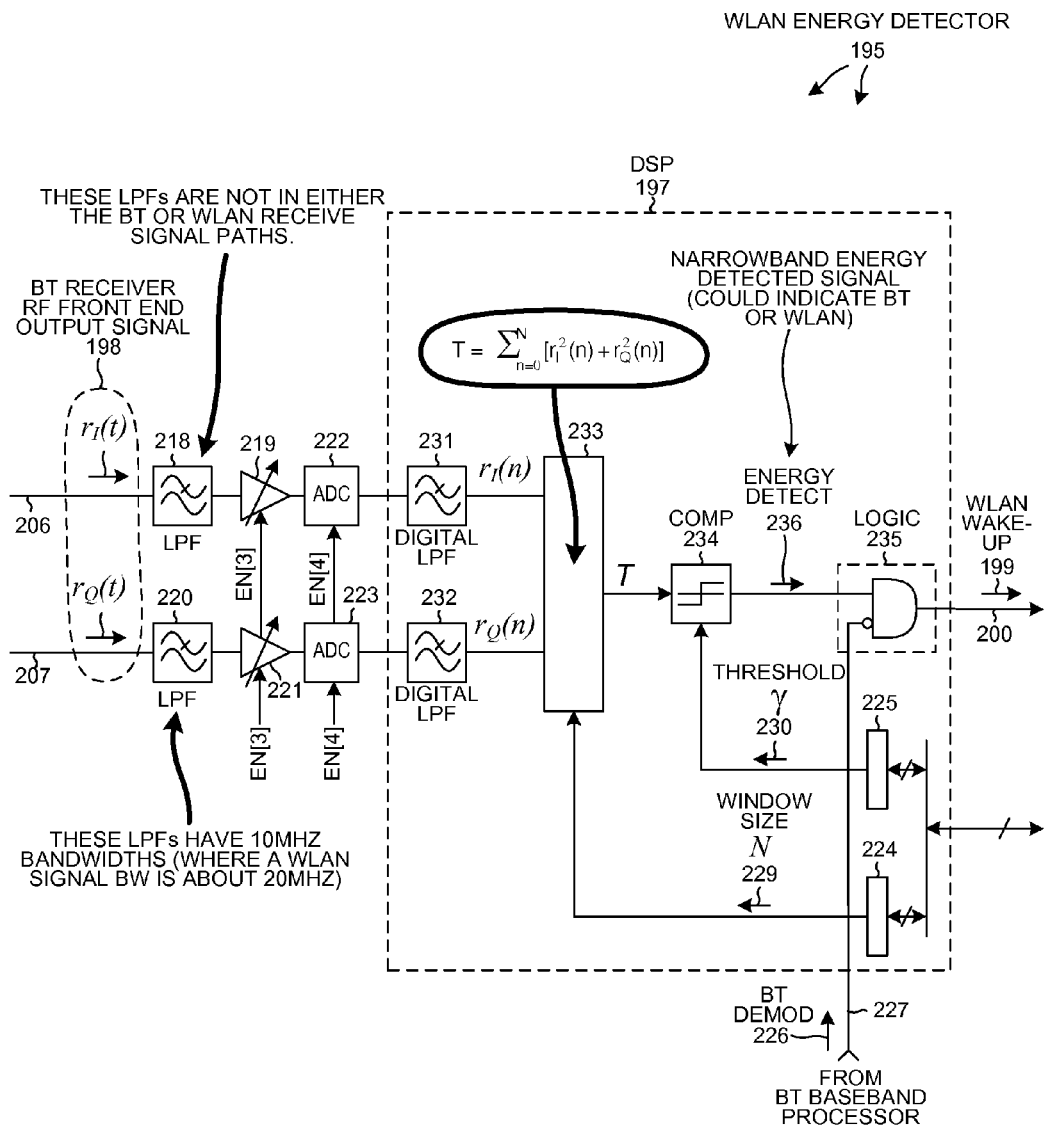
FIG. 6 is a diagram of one example of the WLAN energy detector circuit 195 of FIG. 5.

FIG. 6 is a diagram of one example of the WLAN energy detector circuit 195 of FIG. 5. WLAN energy detector circuit 195 detects any WLAN signals that fall within the 2.4 GHz band of the BT RF receiver front end 201. For any given SNR, the worst case for detection may occur when the AP is only transmitting beacon packets, since this typically minimizes the duty cycle of a WLAN network. The detector may detect WLAN beacons with good detection sensitivity and a low detection delay such that high detection probability $P_D$ and low false alarm probability $P_{FA}$ may be achieved even at a low Signal-to-Noise Ratio (SNR). ADCs 222, 223 to convert the filtered and amplified versions of the BT front end output signals $r_I(t)$ and $r_Q(t)$ into corresponding streams of discrete time sampled signals $r_I(n)$ and $r_Q(n)$, respectively. DSP 197 includes digital low-pass filter portions 231, 232, a processing portion 233, a comparison portion 234, and a logic gating function portion 235. The logical value as output from logic gating function portion 235 determines whether WLAN wake-up signal 199 is asserted or not. The frequency to which the Bluetooth receiver RF front end is tuned is denoted $f_{BT}$. Generally, $f_{BT}$ is a pseudo-random integer frequency between 2402 MHz and 2480 MHz, determined by the Bluetooth device address and the Bluetooth clock frequency and the Bluetooth mode of operation. The center frequency of the WLAN signal in the 2.4 GHz band may be denoted by $f_{WL}$. For a given WLAN network, $f_{WL}$ may be a deterministic frequency satisfying (2412+5(k−1)) MHz, where k is an integer between 1 and 13. However $f_{WL}$ generally is not known until after detection. After a WLAN signal is detected by the WLAN energy detector, the WLAN radio may wake up and perform a normal channel scan and connection setup procedure. A successful WLAN channel scan determines the value of $f_{WL}$.

The down-converted output signal 198 (signals $r_I(t)$ and $r_Q(t)$) at the inputs of the WLAN energy detector circuit 195 typically have an intermediate frequency (IF) given by $f_{IF}=|f_{BT}-f_{WL}|$. The WLAN energy detector circuit 195 may be regarded as a low IF receiver that may perform the following hypothesis test of equation (1):

$$\begin{cases} H_0: & r(t) = n(t) \\ H_1: & r(t) = s(t) + n(t) \end{cases} \qquad \text{Eq (1)}$$

where r(t), s(t) and n(t) represent the received signal at time t, the WLAN signal at time t, and the additive noise at time t, respectively. Hypothesis $H_0$ corresponds to inadequate energy detected for there to be a WLAN signal determined to be present in the received signal. Hypothesis $H_1$ corresponds to adequate energy detected within the detection band of the WLAN energy detector for there to be a WLAN signal determined to be present. Since $f_{BT}$ is random and $f_{WL}$ is unknown, the resultant $f_{IF}$ may be a random real number denoting a frequency.

As depicted in FIG. 6, the $r_I(t)$ and $r_Q(t)$ signal components ($r_I(t)$ and $r_Q(t)$ together constitute output signal 198) first pass through low-pass filters (LPFs) 218 and 220 for noise suppression. The bandwidth of the LPFs is denoted by $BW_{LP}$. This bandwidth is determined based on tradeoffs between noise suppression (or equivalently detection sensitivity) and detection delay d. The noise suppressed signals at the low-pass filter outputs are amplified by amplifiers 219, 221 prior to being digitized by ADCs 222 and 223. ADCs 222 and 223 convert the analog signal components into discrete time sampled digital signal components $r_I(n)$ and $r_Q(n)$ for further processing by DSP 197. Because detection of a WLAN signal typically has a resultant $f_{IF}$ falling within the pass band of the LPF, image rejection typically is not needed. Additionally, the requirement on I/Q imbalance of the WLAN energy detector may also be relaxed. Direct-conversion and low-IF receivers typically have In-phase (I) and Quadrature-phase (Q) signal components. These I and Q phase components generally should have a ninety degree phase offset and should have equal amplitudes to enable the signal components to be separated and recovered without mutual interference. Any offsets in the phase and amplitude may be referred to as I/Q imbalance or I/Q mismatch. Because WLAN energy detector circuit 195 only need to measure total energy of the received signal and does not need to recover the WLAN waveform, any mixing of signals does not change the total energy received. As such, the I/Q imbalance may be relaxed.

In certain embodiments, only one of I phase or Q phase signal components is processed to further simplify the WLAN energy detector circuit and further reduce power consumption. This may simplify the design of the WLAN energy detector circuit, resulting in less power consumption as compared to a typical low-IF receiver. Because detection of the total energy of the WLAN signal within the pass band of the WLAN energy detector circuit rather than recovery of the exact waveform of the WLAN signal is done, ADCs 222 and 223 may be low precision ADCs.

In the embodiment of FIG. 6, digital low-pass filter portions 231, 232 perform additional digital low-pass filtering to enhance the signal before the processing portion 233 computes a total energy decision statistic T. Decision statistic T may be used as a decision rule to decide hypothesis $H_0$ or $H_1$. In the case of Gaussian noise and a Guassian signal, the decision rule is given by equation (2) below $$\begin{cases} \text{Decide } H_0 & \text{if } T = \sum_{n=0}^{N} r^2[n] < \gamma \\ \text{Decide } H_1 & \text{if } T = \sum_{n=0}^{N} r^2[n] > \gamma \end{cases} \quad \text{Eq (2)}$$

$$\text{where } T = \sum_{n=0}^{N} r^2[n]$$

is the decision statistic, where r[n] is the square root of the sum of $r_I(n)^2$ and $r_Q(n)^2$, where n is the time index, where N is the duration of the signal in terms of numbers of samples, and where γ is the decision threshold value. When WLAN energy detector circuit 195 is on, the processing portion 233 of DSP 297 determines decision statistic T. Comparator portion 234 compares the value T with the threshold value γ 230. If T exceeds the threshold value γ, then energy detect signal 236 is asserted, otherwise energy detect signal 236 is not asserted. The energy detect signal 236 may, however, be asserted high due to energy of a Bluetooth signal being detected. To prevent the WLAN wake-up signal from being asserted in conditions when it is energy from a Bluetooth signal that causes energy detect signal 236 to be asserted, logic gating function portion 235 blocks the WLAN wake-up signal 199 from being asserted if the Bluetooth modem 178 successfully demodulates a Bluetooth signal. As indicated above, the Bluetooth modem 178 asserts the BT demod signal 226 in the condition of a Bluetooth signal being successfully demodulated. Accordingly, if energy is detected (as indicated by energy detect signal 236 being asserted high) and if no Bluetooth signal has been successfully demodulated (as indicated by BT demod signal 226 being deasserted low), then WLAN wake-up signal 199 is asserted high, otherwise the WLAN wake-up signal 199 is not asserted. Assertion of WLAN wake-up signal 199 causes the WLAN radio to be powered up and enabled to perform a channel scan and connection setup procedure.

The decision rule of equation (2) set forth above is just one example of a decision rule that can be used. In one embodiment, a sliding window energy detection algorithm may be implemented. In this case, the decision rule may be expressed as indicated by equation (3) below:

$$T_\Omega = \sum_{i=0}^{N-1} [r_I^2(n-i) + r_Q^2(n-i)] \quad \text{Eq (3)}$$

where N is the window size. For a sample interval $T_S$ in the digital domain, setting $N \times T_S \geq w_{WLBK}$ generally guarantees that the window is wide enough to capture all of the energy in a WLAN beacon, where $w_{WLBK}$ is the length in time (duration) of a WLAN beacon. It should be noted that with a sliding window, the decision rule may be the total energy captured within the window of size N 229. This total energy captured in the window may be compared with a threshold. Generally N is chosen to be large enough to cover a whole WLAN scan duration ($N \times T_S \geq w_{WLBK}$). Note that the energy captured within the window is generally not the total energy within a Bluetooth scan.

In another embodiment, a double sliding window is employed. In this case, the decision rule may be a ratio between two consecutive windows (each of size N). The decision rule represents the relative energy change in 2N consecutive samples rather than total energy.

Varying the Durations of the BT Scan Intervals

In the system 100 described above in connection with FIGS. 1-6, the WLAN energy detector circuit 195 processes the output signal 198 of the BT receiver RF front end 201 during BT scan windows. A BT scan window in the BT page scan mode is about 11.25 milliseconds in duration. The conventional BT page scan interval, however, is 1280 milliseconds in duration. The BT receiver RF front end is not powered, is not operational, and is not used to receive any type of signal for most of the BT scan interval. The WLAN energy detector circuit 195 that processes the output signal 198 of the BT receiver RF front end 201 in this particular example is not be capable of detecting WLAN energy during the majority of the BT page scan interval.

The WLAN energy detector circuit 195 generally is used to detect WLAN energy. When there is no active traffic except beacons, then there is only one WLAN beacon packet transmitted per WLAN interval. A WLAN AP periodically broadcasts beacons at the lowest supported data rate to announce the network parameters for a WLAN STA to set up a connection. The payload of a WLAN beacon normally is about 100 bytes in length. When transmitted at 1 Mbps, the lowest supported data rate in most WLAN 802.11b/g networks, a beacon has a duration of about 1.25 milliseconds. The WLAN interval is, however, normally about 100 milliseconds. It is possible, depending on the starting time offset between the sequence of WLAN intervals and the sequence of BT page scan intervals, that a BT scan window will never overlap a WLAN beacon transmission.

Figure 7:
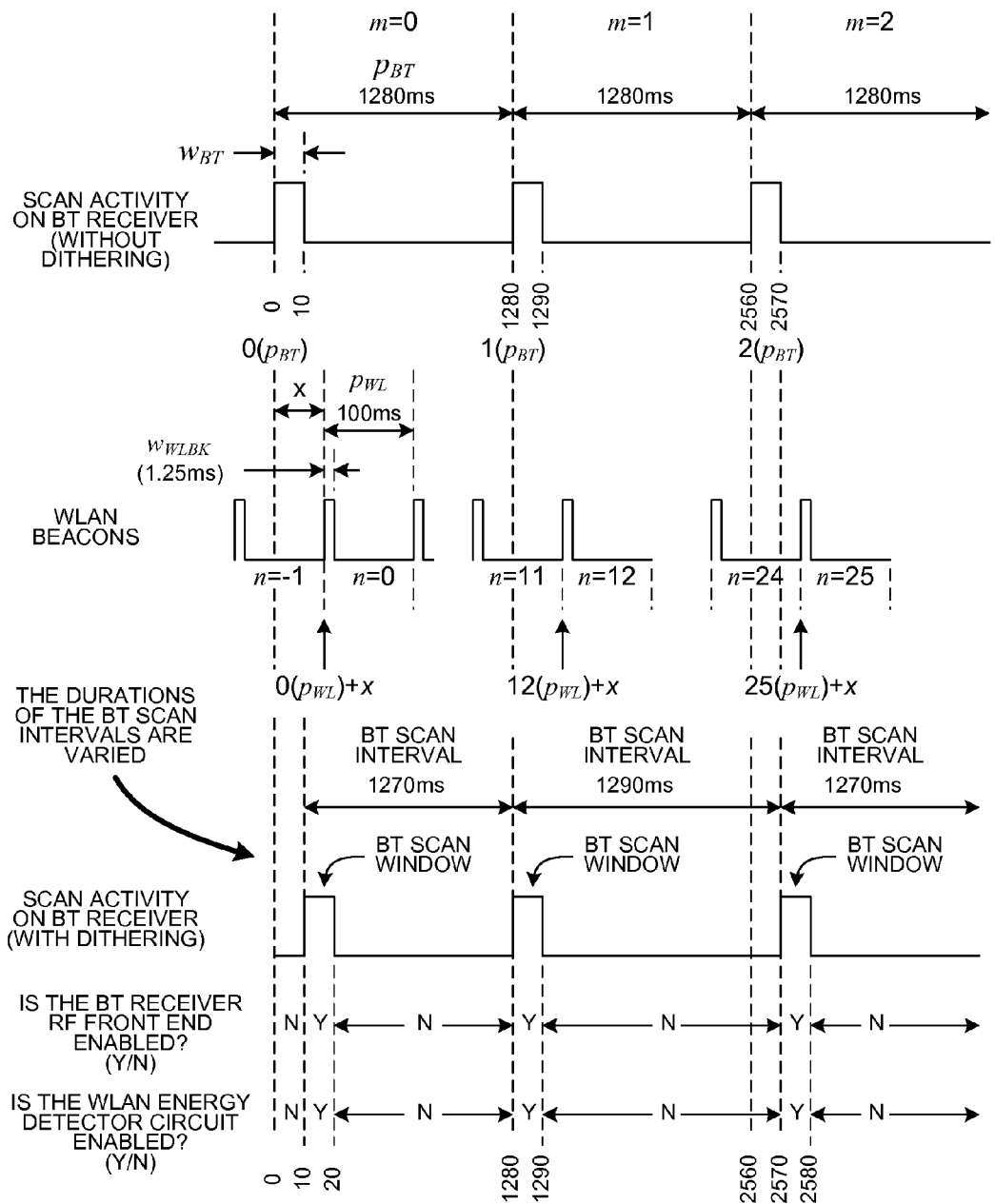
FIG. 7 is a waveform diagram that illustrates an operation of the cellular telephone of FIG. 4 involving a sequence of BT scan intervals and a sequence of WLAN intervals, where the durations of the BT scan intervals are varied such that a BT scan window will overlap a WLAN beacon.

FIG. 7 is a waveform diagram that illustrates a sequence of BT scan intervals and a sequence of WLAN intervals. The upper waveform illustrates the sequence of BT scan intervals. The value $p_{BT}$ is the 1280 millisecond BT scan interval. The value $W_{BT}$ is the duration of the BT scan window. The value m is an index identifying the interval. The value m is zero for the first interval, is one for the next interval, and is two for the next interval, and so forth. The second waveform down in the diagram of FIG. 7 illustrates the sequence of WLAN intervals. The value $p_{WL}$ is the 100 millisecond WLAN interval. The value $w_{WLBK}$ is the 1.25 millisecond duration of a WLAN beacon. The value x is an unknown time offset between the beginning of the m=0 BT scan interval and the n=1 WLAN interval. Because it is unknown, it can be modeled as a uniform random variable.

FIG. 8 is a table that illustrates how a BT scan window may never overlap a WLAN beacon transmission depending on the interval values, BT scan window duration, WLAN beacon duration, and time offset x. In the table, the first column shows the m index for a sequence of BT page scan intervals. For the BT page scan interval of the row, the value in the second column indicates when the BT scan window starts and the value in third column indicates when the BT scan window ends. In the simplified example of the table of FIG. 8, the BT scan window is 10 milliseconds. The BT scan window is 11.25 milliseconds but the useful portion is 10 milliseconds because that is the longest amount of time where it can be guaranteed that the WLAN beacon is entirely contained in the BT scan window. For the BT scan interval of index m=0, the BT scan window starts at time 0 milliseconds and ends at time 10 milliseconds, as indicated by the values in the second and third columns of the first row of values. Similarly, for the BT scan interval of index m=1, the BT scan window starts at time 1280 milliseconds and ends at time 1290 milliseconds, as indicated by the values in the second and third columns of the second row of values. The third row is the index n of the WLAN beacon that occurs during the time of the BT scan window of the row. Accordingly, WLAN beacon of index n=0 would occur during the time of the BT scan window of index m=0 if the time offset between the two sequences of intervals is in a range from zero milliseconds to ten milliseconds. The second row indicates that the WLAN beacon of index n=12 will occur during the BT scan window of index m=1 if the time offset between the two sequences is in a range from 80 milliseconds to 90 milliseconds. Inspection of the table of FIG. 8 reveals a periodic repeating of the time offsets in the right column. Inspection of the values in the right column of FIG. 8 further reveals that there are values of the time offset x for which there is no row entry. For these values of time offset x there is no WLAN beacon that falls in any the BT scan windows of a sequence, regardless of how long the sequence is. For example, a time offset value of x=12 appears in no row of the table.

In accordance with one advantageous aspect, this is recognized and the durations of the BT intervals are varied such that a WLAN beacon is guaranteed to fall within a BT scan window in a sequence of BT scan intervals. Referring again to FIG. 7, the bottom waveform shows a varying of the durations of the BT scan intervals. The first BT scan interval of index m=0 has a duration of 1270 milliseconds, then the second BT scan interval of index m=1 has a duration of 1290 milliseconds, then the third BT scan interval of index m=2 has a duration of 1270 milliseconds, and so forth. In the example of FIG. 7, the BT scan windows are, for ease of illustration and example, shown to be 10 milliseconds rather than 11.25 milliseconds. The method of varying the durations of BT scan intervals, however, works to make a WLAN beacon fall within a BT scan window for the real case of a BT scan window being 11.25 milliseconds.

FIG. 9 is a table that illustrates how a BT scan window is guaranteed to overlap a WLAN beacon transmission for BT scan window duration, the WLAN beacon duration, and the WLAN interval of the example of FIG. 8, where the BT scan intervals are varied in duration as indicated in the bottom waveform of FIG. 7. Note that the start of the BT scan window for the m=1 BT interval starts at time 0 and ends at time 10, and that the start of the BT scan window for the m=1 interval starts at time 1280 and ends at time 1290, and that the start of the BT scan window for the m=2 interval starts at time 2560 and ends at time 2570. Note that this dithering of the BT interval corresponds to the dithering shown in the bottom waveform of FIG. 7. For each row, the value in the rightmost column of the table shows the range of values of the time offset x where the indicated WLAN beacon of indicated in the row will overlap the BT scan window of the row. The time offset x can have a value from zero milliseconds to the WLAN interval duration of 100 milliseconds. As indicated in the rightmost column of FIG. 9, a WLAN beacon will overlap a BT scan interval for any time offset value x.

Mathematically, the required relationships (between the BT interval duration, the WLAN interval duration, the BT scan window duration, the WLAN beacon duration, and the time offset) is shown by the relation of equation (4) that should be satisfied for a WLAN beacon to fall within a BT scan window:

$$p_{BT} \cdot m \leq p_{WL} \cdot n + x \leq p_{ST} \cdot m + w_{BT} - w_{WLBK} \quad \text{Eq (4)}$$

In equation (4), m and n are integers; $p_{BT}$ is the BT scan interval; $p_{WL}$ is the WLAN beacon interval; $w_{BT}$ is duration of the Bluetooth page scan window; $w_{WLBK}$ is the duration of a WLAN beacon; and x is the timing offset. The timing offset x is a value between 0 and $p_{WL}$. If $p_{BT}$=1280 milliseconds and if $p_{WL}$=100 milliseconds, and if $w_{WLBK}$=1.25 milliseconds, and if $w_{BT}-w_{WLBK}$<20 milliseconds, then a timing offset x may exist such that no combination of integers m and n satisfy equation (4). This means that no WLAN beacon will fall into a BT scan window. The resulting detection probability for such a time offset value of x is always zero no matter how good the WLAN energy detector circuit may be.

To eliminate this problem without consuming extra power, the BT page scan intervals are varied in duration. Instead of scheduling a BT page scan every $p_{BT}$ milliseconds, a delay of $p_{BT_D}$ milliseconds in the scheduling routine may be introduced such that $p_{BT_D}$ is zero milliseconds if m is even and such that $p_{BT_D}$ is y milliseconds if m is odd, where y is a positive real number. It is to be appreciated that it might be possible to implement this modification such that compliance with the Bluetooth specification is maintained. For successful detection of a WLAN beacon signal using the modified BT page scan scheduling routine, the condition of equation (5) generally has to be satisfied:

$$p_{BT} \cdot m + p_{BT_D} \leq p_{WL} \cdot n + x \leq p_{BT} \cdot m + p_{BT_D} + w_{BT} - w_{WLBK} \quad (5)$$

Assuming $p_{BT}$=1280 milliseconds, $p_{WL}$=100 milliseconds, $w_{BT}-w_{WLBK}$=10 milliseconds, as discussed earlier, the following condition generally should be satisfied:

$$1280m - 100n + p_{BT_D} \leq x \leq 1280m - 100n + p_{BT_D} + 10 \quad \text{Eq (6)}$$

This is equivalent to equation (5). If for any x in a range of from zero milliseconds to one hundred milliseconds, certain values of integers m and n may be found such that equation (6) is satisfied, then equation (5) may also be satisfied. It may be further verified that for $w_{BT}$=11.25 milliseconds, and $w_{WLBK}$=1.25 milliseconds, if y=10+20k (k=0, 1, 2 . . . ) then the condition for detection specified in equation (5) may be satisfied. In an example in which successive BT scan intervals differ in duration one to the next by twenty milliseconds, a WLAN beacon is guaranteed to fall within a BT scan interval and will be detected by the WLAN energy detector.

Operation of the BT Slave

Figure 10:
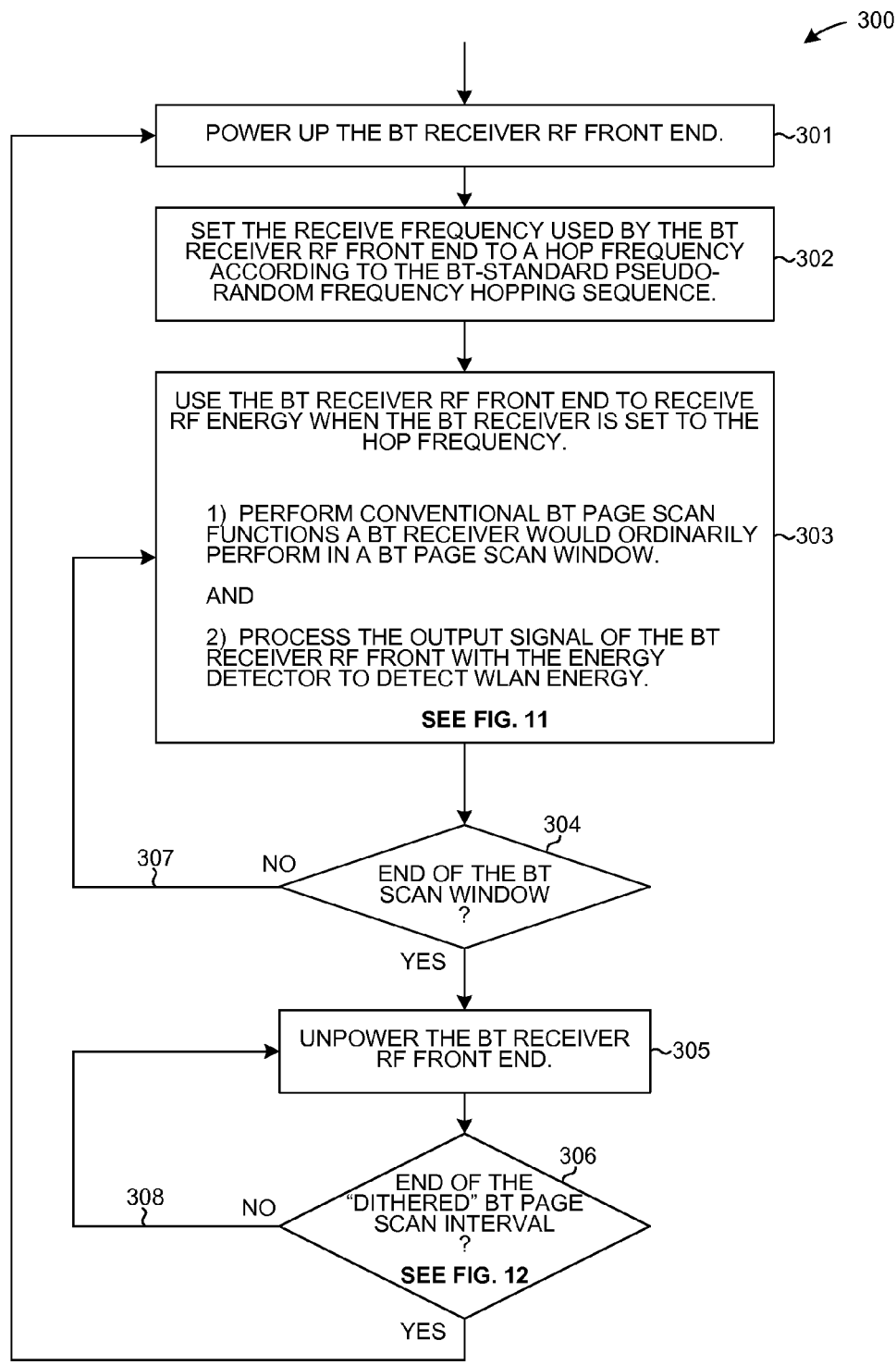
FIG. 10 is a flowchart of a method of operating the BT S 112 of the system of FIG. 1 such that WLAN energy detector circuit 195 attempts to detect WLAN energy during BT scan windows.

FIG. 10 is a flowchart of a method 300 of operation of the BT slave 112 of FIG. 4. Initially, BT receiver RF front end 210 is powered up (step 301) at the beginning of a BT interval. The receive frequency used by BT receiver RF front end 201 is set (step 302) to a hop frequency according to the BT-standard pseudo-random frequency hopping sequence. This frequency is a function of the BT address of the BT slave and its clock value. BT receiver RF front end 201 is then used (step 303) to receive RF energy when the BT receiver is set to the hop frequency. During the BT scan window, the BT receiver RF front end is used to perform a conventional BT page scan. In addition, the WLAN energy detector circuit 195 is used to process the output signal 198 of the BT receiver RF front end to detect WLAN energy. The BT receiver RF front end and WLAN energy detector are powered and operational throughout the entire BT scan window. If the WLAN energy detector circuit detects more than a predetermined amount of RF energy and if the BT baseband processor does not successfully demodulate a BT signal, then the RF energy detected by the WLAN energy detector circuit is assumed to be WLAN energy and the WLAN wake-up signal is asserted. If the end of the BT scan window has not yet been reached, then arrow 307 indicates that the WLAN energy detector circuit continues to be used to process the output of the BT receiver RF front end. At the end of the BT scan window as determined in decision diamond 304, then the BT receiver RF front end 201 and WLAN energy detector circuit 195 are unpowered and disabled (step 305). The durations of the BT page scan intervals are varied, for example, as indicated in the bottom waveform of FIG. 7. As indicated by arrow 308, the BT receiver RF front end 201 and WLAN energy detector circuit 195 remain unpowered as long as the end of the current BT page scan interval has not been reached. If it is determined (step 306) that the end of the current BT page scan interval has been reached, then processing returns to step 301.

Figure 11:
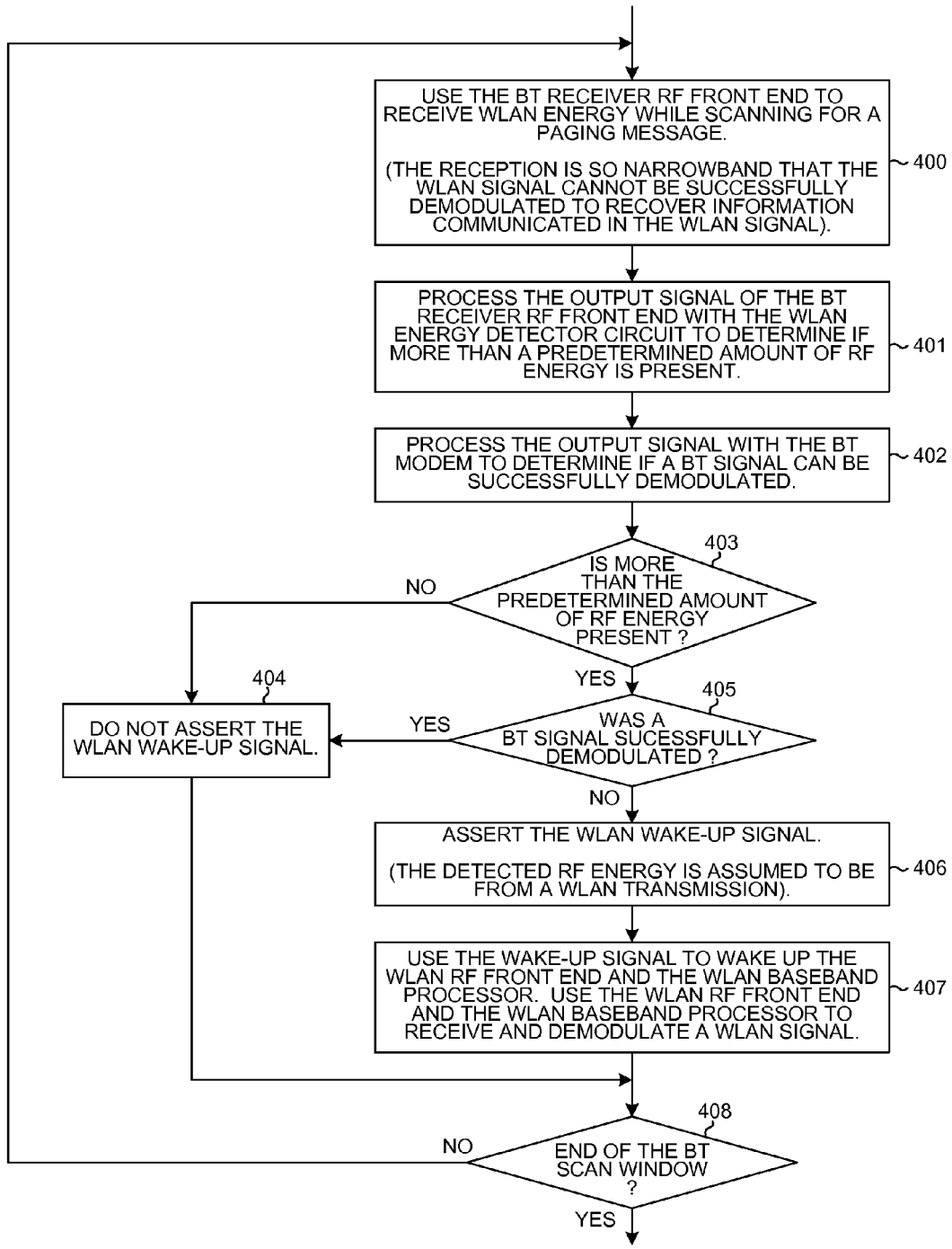
FIG. 11 is a flowchart of steps that are performed in one BT page scan window in the method of FIG. 10.

FIG. 11 is a flowchart of operation in one BT page scan window. The steps of FIG. 11 occur in step 303 of the flowchart of FIG. 10. The BT receiver RF front end 201 is used to receive WLAN energy while scanning for a paging message. The reception is so narrowband that the WLAN signal cannot be successfully demodulated to recover information communicated in the WLAN signal. The WLAN energy detector circuit 195 processes (step 401) the output signal 198 of the BT receiver RF front end 201 to determine if more than a predetermined amount of RF energy is present. The BT modem 178 attempts to demodulate (step 402) the output 213, 215 of the BT receiver RF front end 201. If the WLAN energy detector circuit 195 does not determine that more than the predetermined amount of RF energy is present (step 403), then the WLAN wake-up signal 199 is not asserted (step 404). If WLAN energy detector circuit 195 determines that more than the predetermined amount of RF energy has been detected (step 403), then processing proceeds to decision diamond 405. If the BT modem 178 successfully demodulated a BT signal (step 405), then the WLAN wake-up signal 199 is not asserted (step 404). If, however, the BT mode 178 did not successfully demodulate a BT signal (step 405), then the WLAN wake-up signal 199 is asserted (step 406). The wake-up signal 199 is used (step 407) to power up or otherwise enable the WLAN RF transceiver integrated circuit 146 and the WLAN baseband processor integrated circuit 147. These two integrated circuits 146 and 147 are then used (step 407) to receive and to demodulate a WLAN signal. If it is determined (step 408) that the end of the BT scan window has not yet occurred, then processing returns to step 400. If the end of the BT scan window has been reached (step 408), then processing returns to step 304 of the flowchart of FIG. 10.

Figure 12:
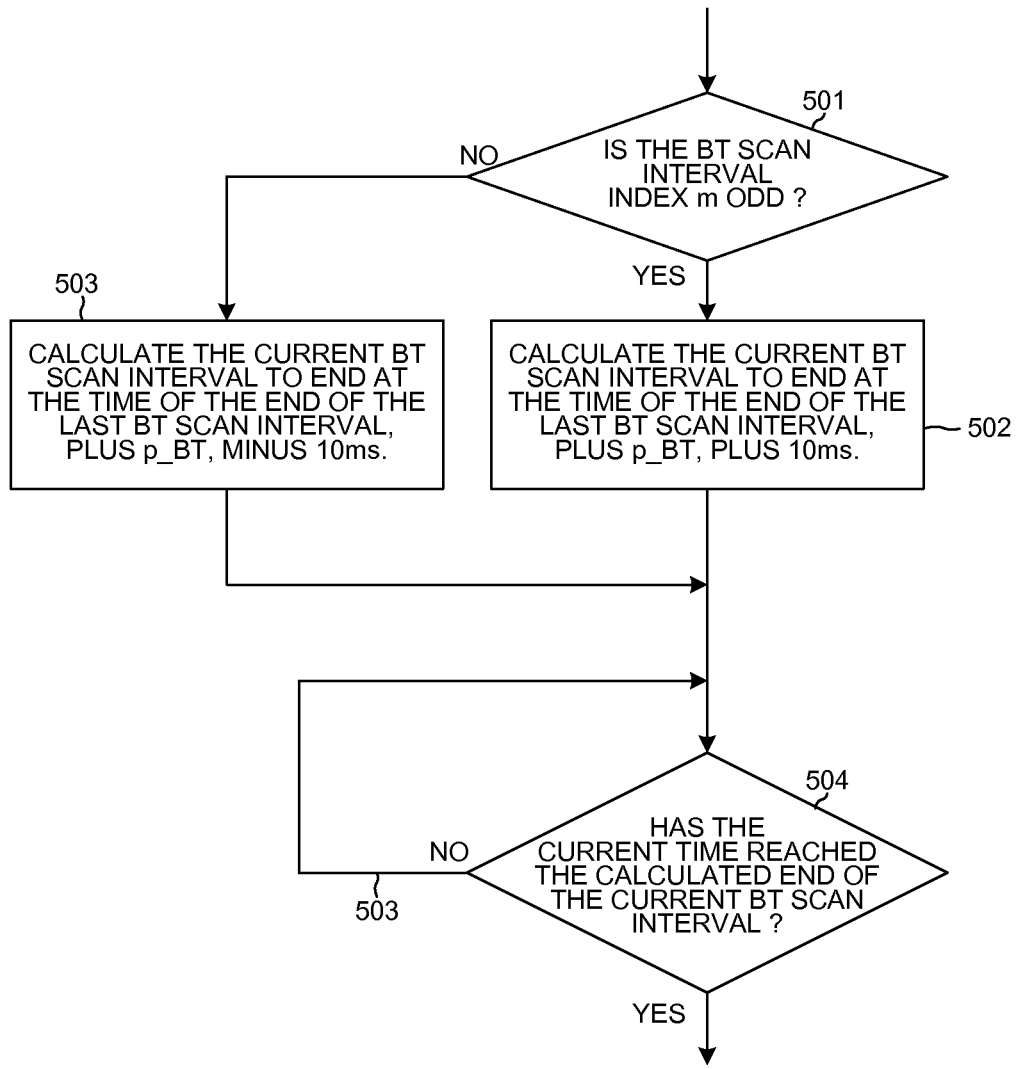
FIG. 12 is a flowchart of steps that are performed in one of the steps of the method of FIG. 10 to dither the durations of BT scan intervals.

FIG. 12 is a flowchart of operation sub-steps of the decision made in decision diamond 306 of FIG. 10. If the BT scan interval index m is odd (step 501), then processing proceeds to block 502, otherwise processing proceeds to block 503. In block 502, because the BT scan interval index m is odd, the current BT scan interval is calculated (step 502) to start at the end of the last BT scan interval and to end at the end of the last BT scan interval, plus one BT scan interval time $p_{BT}$, plus 10 milliseconds. In the example of the bottom waveform of FIG. 7, $p_{BT}$ is 1280 milliseconds. The calculated current BT interval is therefore of a duration of 1280 milliseconds plus 10 milliseconds. If, on the other hand, the BT scan interval index m is not odd (i.e., is even), then the current BT scan interval is calculated (step 503) to start at the end of the last BT scan interval and to end at that time plus one BT scan interval time $p_{BT}$, minus 10 milliseconds. The calculated current BT interval is therefore of a duration of 1280 milliseconds minus 10 milliseconds. As indicated by arrow 502, processing stays at step 504 as long as the current time has not reached the calculated end of the current BT scan interval. When it is determined in decision diamond 504 that the current time has reached the calculated end of the current BT scan interval, then processing returns to step 306 of FIG. 10.

Figure 13:
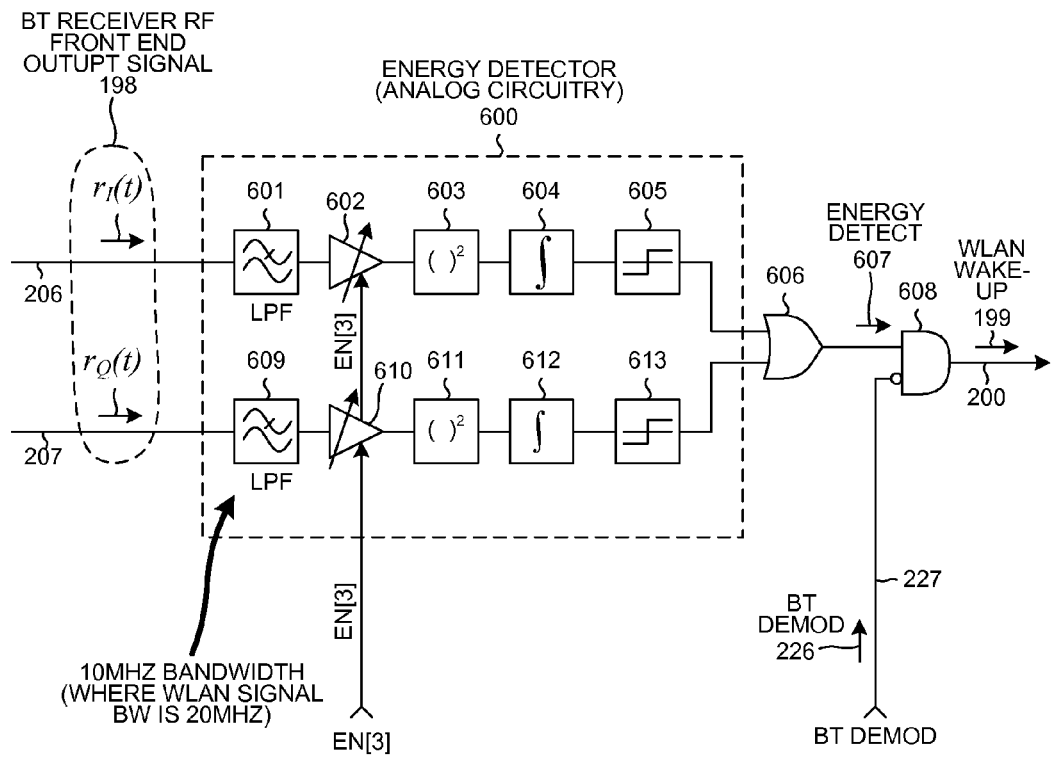
FIG. 13 is a circuit diagram of an analog implementation of the WLAN energy detector circuit 195 of FIG. 4.

FIG. 13 is a circuit diagram of an analog implementation 600 of a WLAN energy detector circuit suitable for use in the BT slave 112 of FIG. 4. By not including ADCs and not including a DSP in the WLAN energy detector circuit, the circuit design can be simplified and power consumption can be reduced. The analog implementation 600 cannot, however, normally give the same performance as compared with the implementation using digital processing. An I signal path extends from conductor 206 to the upper input lead of an OR gate 606. A Q signal path extends from conductor 207 to the lower input lead of OR gate 606. The I signal path includes an analog LPF 601 to suppress unwanted noise, an adjustable gain amplifier 602, a signal squaring component 603, a signal integrating component 604, an analog comparator 605 to detect when the received signal component exceeds a specified threshold, to the upper input lead of OR gate 606. The Q signal path includes an analog LPF 609 to suppress unwanted noise, an adjustable gain amplifier 610, a signal squaring component 611, a signal integrating component 612, an analog comparator 613 to detect when the received signal component exceeds a specified threshold, to the lower input lead of OR gate 606. OR gate 606 generates the energy detect signal 607. If the BT demod signal 226 is not asserted (is a digital low indicating that a BT signal was not demodulated), and if the energy detect signal 607 is asserted, then an AND gate 608 asserts the WLAN wake-up signal 199. To further reduce power consumption, the energy detection may be done with only the in phase $r_I(t)$ circuitry or only the quadrature phase $r_Q(t)$ circuitry. Further, the WLAN energy detector circuit may be implemented without down-converting the received RF signal to baseband so that the mixer may be removed.

The analog energy detector may considered to implement a sliding window energy detection algorithm. In this case, the decision rule for the hypothesis test may be expressed as:

$$T_t = \int_{t-T}^{s} [r_I^2(t) + r_q^2(t)]^{\square} \qquad \text{Eq (7)}$$

where $T_t$ is the computed value of the decision rule, where t is time, where T is the window size which typically is chosen large enough to cover the whole WLAN beacon so as to capture all the energy of the WLAN beacon. The analog comparators 605, 613 in the analog implementation 600 effectively compare $T_t$ with a pre-chosen threshold. Once the threshold is crossed, the WLAN wake-up signal 199 is asserted provided the BT demod signal 226 indicates that a BT signal has not been successfully demodulated.

Energy Detector vs. Packet Preamble Correlator

WLAN signal detection in a traditional WLAN receiver is normally based on both energy detection and correlation with packet preambles. Preamble correlation provides processing gain that may provide better performance (especially in terms of sensitivity) than pure energy detection, hence allowing detection of very weak WLAN signals. As a compromise between maintaining good detection performance and reducing overall power consumption, certain embodiments may use the WLAN energy detector circuit and the BT receiver RF front end to detect not-that-weak WLAN signals and also to wake up the WLAN correlator in the WLAN receiver less frequently than conventional WLAN radios to detect very weak WLAN signals. This approach may reduce overall power consumption, while maintaining good detection performance for weaker WLAN signals. In this embodiment, energy detection may be used most of the time and the use of WLAN preamble correlation may be reduced to save power. Note that preamble correlation generally consumes more power because more complex circuits may be required.

Various novel aspects of the embodiments described above can be practiced independently of one another. For example, the varying of the durations of the BT scan intervals can be practiced without use of any special or additional WLAN energy detector circuit. The BT baseband processor may, for example, detect RF energy that it determines is likely not BT energy such that the BT baseband processor itself generates the WLAN wake-up signal without an additional WLAN energy detector circuit.

Figure 14:
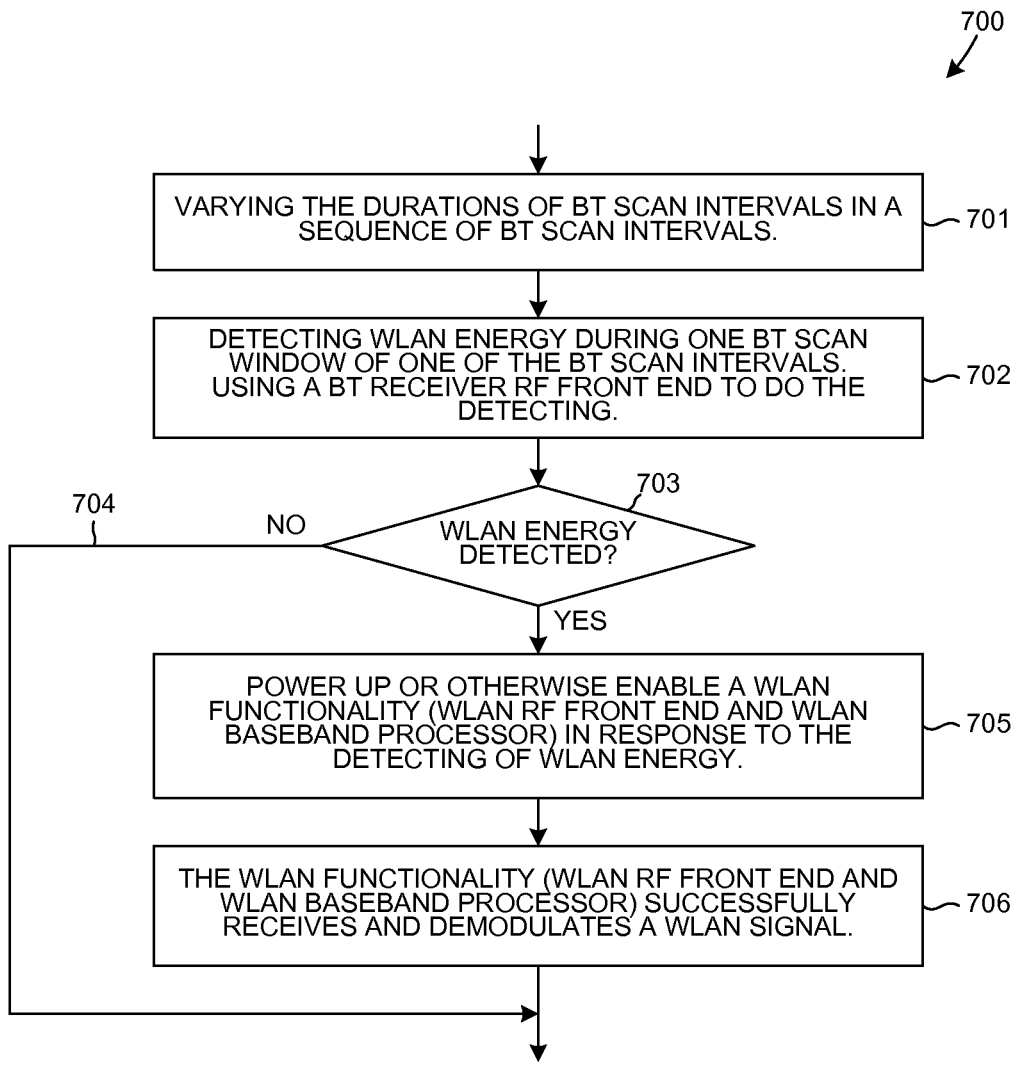
FIG. 14 is a flowchart of a method of varying the durations of BT scan intervals in accordance with one novel aspect.

FIG. 14 is a flowchart of a method 700 of varying the durations of BT scan intervals so that a BT scan window will overlap a WLAN beacon. The durations of BT scan intervals in a sequence of BT scan intervals are varied (step 701). WLAN energy is detected (step 702) during one of the BT scan windows of one of the BT scan intervals. In one example, the BT baseband processor integrated circuit 149 detects RF energy that it determines is likely not BT energy. When the BT baseband processor integrated circuit 149 makes this determination, it asserts the WLAN wake-up signal 199 without use of an additional WLAN energy detector circuit. The method 700 may or may not involve use of a special WLAN energy detector circuit. If WLAN is not detected (step 703), then as indicated by arrow (step 704) a step of powering up a WLAN functionality is skipped and the WLAN functionality remains unusable to receive a WLAN signal. If, however, WLAN energy is detected (step 703), then the WLAN functionality is powered up or otherwise enabled (step 705). In one example, this WLAN functionality is the WLAN RF transceiver integrated circuit 146 and the WLAN baseband processor integrated circuit 147. The WLAN functionality, once powered up and enabled, then successfully receives and demodulates a WLAN signal (step 706). In one example of the method 700, all of the energy detection that results in the powering up of the WLAN functionality occurs in the one BT scan window of step 702. The energy detection operation that occurs during the BT scan window may be referred to as an energy scan. In some examples, the WLAN energy detector circuit and BT receiver RF front end are unpowered both immediately before the start of the BT scan window and immediately after the end of the BT scan window.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In one example, timing mechanism 191 of FIG. 4 is a set of processor-executable firmware instructions for varying the durations of BT scan intervals. The instructions of the timing mechanism firmware are stored in memory 185 that is a processor-readable medium readable by processor 180. Moreover, DSP 197 of FIG. 4 executes a set of processor-readable instructions such that the DSP determines if the amount of RF energy received in a BT scan window exceeds the predetermined threshold y, and receives the BT demod signal 226, and makes the determination whether to assert the WLAN wake-up signal 220. The instructions executed by DSP 197 are stored in a processor-readable medium portion of DSP 197.

Although certain specific embodiments are described above for instructional purposes, the teachings of this patent document have general applicability and are not limited to the specific embodiments described above. Although the blocks in the flowcharts described above are referred to as steps, the use of the term "step" is not intended necessarily to imply any particular order. Some of the steps may be actions that are performed simultaneously or continuously. Accordingly, various modifications, adaptations, and combinations of the various features of the described specific embodiments can be practiced without departing from the scope of the claims that are set forth below. Although the piggy-back energy detection methods and structures described above involve BT and WLAN, the methods and structures disclosed are of general applicability and extend to use with any two wireless technologies, where each of the two wireless technologies transmits intermittently in a larger time interval.

What is claimed is:

1. A method comprising:
   (a) using a Bluetooth (BT) receiver Radio Frequency (RF) front end in a page scan mode to receive in a sequence of BT scan windows;
   (b) receiving Wireless Local Area Network (WLAN) energy onto the Bluetooth (BT) receiver RF front end during one of the BT scan windows during which a WLAN transceiver is in a low power state and a BT transceiver, co-located with the WLAN transceiver and having the BT receiver RF front end, is scanning for a BT signal;
   (c) using an energy detector to process an output signal of the BT receiver RF front end when the BT receiver RF front end is receiving the WLAN energy during the one of the BT scan windows;
   (d) based at least in part on a result of the processing of (c) asserting a wake-up signal, wherein the asserting of the wake-up signal is indicative of the BT receiver RF front end having received the WLAN energy during the one of the BT scan windows;

(e) using a BT baseband processor to process the output signal of the Bluetooth receiver RF front end and as a result of the processing outputting a BT detected signal, wherein the BT detected signal is indicative of whether the BT baseband processor has successfully demodulated the output signal; and (f) using the BT detected signal to prevent the wake-up signal from being asserted if the BT baseband processor has successfully demodulated the output signal.

2. The method of claim 1, wherein each BT scan window of the sequence of BT scan windows in (a) is a part of a corresponding BT scan interval of a sequence of BT scan intervals, wherein each of the BT scan intervals has a duration, and wherein the durations of the BT scan intervals of the sequence of BT scan intervals are not identical.

3. The method of claim 1, wherein each BT scan window of the sequence of BT scan windows in (a) is a part of a corresponding BT scan interval of a sequence of BT scan intervals, wherein each of the BT scan intervals has a duration, and wherein the durations of the BT scan intervals of the sequence of BT scan intervals vary.

4. The method of claim 1, wherein substantially all of the WLAN energy received in (b) is received during the one of the BT scan windows, and wherein the output signal processed in (c) is due to the WLAN energy received in (b) and is not due to other WLAN energy received outside the one of the BT scan windows.

5. The method of claim 1, further comprising:

(g) in response to the asserting of the wake-up signal powering up at least a portion of a WLAN receiver, wherein the WLAN receiver includes a WLAN receiver RF front end and a WLAN baseband processor; and (h) using the WLAN receiver RF front end and the WLAN baseband processor to receive and to demodulate a WLAN signal.

6. The method of claim 5, further comprising:

(i) disabling the energy detector after said at least a portion of the WLAN receiver has been powered up in (g).

7. The method of claim 1, wherein the BT receiver RF front end is in a low power state immediately preceding the BT scan window such that immediately preceding the BT scan window the BT receiver RF front end is incapable of receiving a Bluetooth signal.

8. The method of claim 1, wherein the BT receiver RF front end has a receive signal bandwidth that is substantially less than twenty megahertz.

9. The method of claim 1, further comprising:

(g) using the BT receiver RF front end to perform a BT page scan during the one of the BT scan windows.

10. The method of claim 1, further comprising:

using the BT receiver RF front end during a BT scan window both to detect WLAN energy and to receive a BT page scan signal.

11. The method of claim 1, wherein the using of the BT receiver RF front end in the page scan mode in (a) involves tuning the BT receiver RF front end to have a receive frequency that changes from BT scan window to BT scan window in accordance with a pseudo-random frequency hopping sequence.

12. The method of claim 1, wherein the energy detector has a first portion and a second portion, wherein the first portion outputs a value indicative of an amount of RF energy received by the BT receiver RF front end during the one of the BT scan windows, and wherein the second portion compares the value output by the first portion to a threshold value.

13. A method, comprising:

using a Bluetooth (BT) receiver in a page scan mode to scan in a plurality of BT scan windows during which a Wireless Local Area Network (WLAN) transceiver is in a low power state and a BT transceiver, co-located with the WLAN transceiver and having the BT receiver, is scanning for a BT signal, wherein the BT receiver comprises a BT receiver RF front end and a BT baseband processor, wherein each BT scan window is within a corresponding BT scan interval, wherein the BT scan intervals together are a sequence of BT scan intervals, and wherein the BT scan intervals of the sequence of BT scan intervals vary in duration;

using an energy detector to process an output signal of the BT receiver RF front end, wherein the energy detector detects energy in a bandwidth, and wherein the bandwidth is substantially greater than one megahertz and substantially less than twenty megahertz;

using the BT baseband processor to process the output signal; and outputting a wake-up signal, wherein the wake-up signal is indicative of the energy detector detecting an amount of WLAN energy during one of the BT scan windows and of the BT transceiver not successfully demodulating a BT signal.

14. A method comprising:

(a) operating a Bluetooth (BT) receiver Radio Frequency (RF) front end in a BT page scan mode during which a Wireless Local Area Network (WLAN) transceiver is in a low power state and a BT transceiver, co-located with the WLAN transceiver and having the BT receiver RF front end, is scanning for a BT signal, wherein the BT receiver RF front end has a receive signal bandwidth that is substantially less than twenty megahertz;

(b) using an energy detector to process an output signal of the BT receiver RF front end and as a result of the processing outputting a first signal indicative of whether the BT receiver RF front end has received an amount of WLAN energy;

(c) using a BT baseband processor in an attempt to demodulate the output of the BT receiver RF front end and as a result of the attempted demodulation outputting a second signal indicative of whether the BT baseband processor could not successfully demodulate a BT signal; and (d) asserting a wake-up signal if both: 1) the first signal indicates the amount of WLAN energy was received, and 2) the second signal indicates that the BT baseband processor could not successfully demodulate a BT signal.

15. The method of claim 14, wherein the using of the energy detector to process the output signal in (b) occurs substantially entirely within a single BT scan window, and wherein the using of the BT baseband processor in the attempt to demodulate the output signal in (c) occurs substantially entirely within the single BT scan window.

16. The method of claim 14, wherein a receive frequency of the BT receiver RF front end is tuned to hop in a pseudo-random frequency hopping sequence from BT scan window to BT scan window in a sequence of BT scan windows when the BT receiver RF front end is operated in the BT page scan mode in (a), and wherein the energy detector is used in (b) during one of the BT scan windows of the sequence of BT scan windows.

17. A circuit, comprising:
a Bluetooth (BT) receiver Radio Frequency (RF) front end that receives an amount of Wireless Local Area Network (WLAN) energy in one BT scan window during which a WLAN transceiver is in a low power state and a BT transceiver, co-located with the WLAN transceiver and having the BT receiver RF front end, is scanning for a BT signal;
a BT baseband processing circuit that receives an output signal from the BT receiver RF front end; and
an energy detector that processes the output signal when the BT receiver RF front end is receiving the WLAN energy during the one BT scan window and based at least in part on a result of the processing asserts a wake-up signal, wherein the wake-up signal is indicative of the BT receiver RF front end having received the WLAN energy during the one BT scan window; and
wherein the BT baseband processing circuit supplies a BT detected signal to the energy detector, wherein the BT detected signal is indicative of whether the BT baseband processing circuit has successfully demodulated a BT signal; and wherein said energy detector uses the BT detected signal to prevent the wake-up signal from being asserted if the BT baseband processing circuit has successfully demodulated the output signal.

18. The circuit of claim 17, wherein substantially all of the amount of WLAN energy is received by the BT receiver RF front end during the one BT scan window.

19. The circuit of claim 17, wherein the output signal processed by the energy detector is due to the amount of WLAN energy being received by the BT receiver RF front end and is not due to other WLAN energy received by the BT receiver RF front end outside the one BT scan window.

20. The circuit of claim 17, wherein the BT baseband processing circuit includes a timing mechanism that determines when BT scan intervals end, and wherein the durations of BT scan intervals are not all identical.

21. The circuit of claim 17, wherein the energy detector comprises:
a filter;
an Analog-to-Digital Converter (ADC); and
a Digital Signal Processor (DSP), wherein a signal path extends from a mixer of the Bluetooth receiver RF front end, through the filter, through the ADC, and to the DSP.

22. A circuit, comprising:
a Bluetooth (BT) receiver Radio Frequency (RF) front end that receives an amount of Wireless Local Area Network (WLAN) energy in a single BT scan window during which a WLAN transceiver is in a low power state and a BT transceiver, co-located with the WLAN transceiver and having the BT receiver RF front end, is scanning for a BT signal;
means for processing an output signal of the BT receiver RF front end when the BT receiver RF front end is receiving the WLAN energy during the single BT scan window and for asserting a wake-up signal as a result of the processing, wherein the wake-up signal is indicative of the BT receiver RF front end having received the amount of WLAN energy during the single BT scan window;
a BT baseband processing circuit that receives the output signal, wherein the BT baseband processing circuit attempts to demodulate the output signal when the BT receiver RF front end is receiving amount of WLAN energy in the single BT scan window; and
wherein the BT baseband processing circuit supplies a BT detected signal to the means for processing, and wherein the means for processing does not assert the wake-up signal if the BT detected signal is demodulated.

23. The circuit of claim 22, wherein the BT receiver RF front end is substantially unpowered immediately preceding the single BT scan window, wherein the BT receiver RF front end has a receive frequency, wherein the receive frequency is substantially fixed throughout the BT scan window, and wherein the BT receiver RF front end is substantially unpowered immediately following the single BT scan window.

24. The circuit of claim 22, wherein the single BT scan window is a BT scan window in a sequence of BT scan windows, wherein each of the BT scan windows is part of a corresponding BT scan interval, wherein the BT scan intervals together are a sequence of BT scan intervals, wherein each BT scan interval has a duration, and wherein the durations of the BT scan intervals of the sequence of BT scan intervals are not all identical.

25. The circuit of claim 22, wherein the means comprises a filter, an Analog-to-Digital Converter (ADC), and a Digital Signal Processor (DSP), wherein a signal path extends from the BT receiver RF front end, through the filter, through the ADC, and to the DSP.

26. A non-transitory processor-readable medium storing a set of processor-executable instructions, wherein execution of the set of processor-executable instructions by a processor performs a method of:
controlling a Bluetooth (BT) receiver Radio Frequency (RF) front end to receive in a sequence of BT scan windows during which a Wireless Local Area Network (WLAN) transceiver is in a low power state and a BT transceiver, co-located with the WLAN transceiver and having the BT receiver RF front end, is scanning for a BT signal such that an output signal of the BT receiver RF front end is processed when the BT receiver RF front end is receiving an amount of WLAN energy and such that in response to the processing a wake-up signal is asserted, wherein the wake-up signal is indicative of the BT receiver RF front end having received the amount of WLAN energy during the one of the BT scan windows and of the BT transceiver not successfully demodulating a BT signal.

27. The non-transitory processor-readable medium of claim 26, wherein each BT scan window of the sequence of BT scan windows is within a corresponding BT scan interval, wherein the BT scan intervals together are a sequence of BT scan intervals, and wherein the BT scan intervals of the sequence of BT scan intervals vary in duration.

28. The non-transitory processor-readable medium of claim 27, wherein execution of the set of instructions by the processor causes times when the BT scan windows occur to be determined.

29. The non-transitory processor-readable medium of claim 27, wherein execution of the set of processor-executable instructions by the processor further performs the method of:
performing some of the processing on the output signal of the BT receiver RF front end, wherein said some processing is digital signal processing.

* * * * *